(12) United States Patent
Doshi et al.

(10) Patent No.: US 12,739,313 B2
(45) Date of Patent: Sep. 15, 2026

(54) FEDERATED DISTRIBUTION OF COMPUTATION AND OPERATIONS USING NETWORKED PROCESSING UNITS

(71) Applicant: Intel Corporation, Santa Clara, CA (US)

(72) Inventors: Kshitij Arun Doshi, Tempe, AZ (US); Vesh Raj Sharma Banjade, Portland, OR (US); Satish Chandra Jha, Portland, OR (US); Francesc Guim Bernat, Barcelona (ES); S M Iftekharul Alam, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/090,686

(22) Filed: Dec. 29, 2022

(65) Prior Publication Data

US 2023/0136048 A1 May 4, 2023

Related U.S. Application Data

(60) Provisional application No. 63/425,857, filed on Nov. 16, 2022.

(51) Int. Cl.
*G06F 9/50* (2006.01)
*G06F 9/30* (2018.01)
(Continued)

(52) U.S. Cl.
CPC ............ *H04L 67/63* (2022.05); *G06F 9/3005* (2013.01); *G06F 9/3885* (2013.01); (Continued)

(58) Field of Classification Search
CPC ..... G06F 9/3005; G06F 9/4881; G06F 9/5072
See application file for complete search history.

(56) References Cited

U.S. PATENT DOCUMENTS 7,065,764 B1 * 6/2006 Prael ..................... G06F 9/5072 703/2
7,716,336 B2 * 5/2010 Coppinger ............. G06F 9/505 709/201

(Continued)

OTHER PUBLICATIONS

M. Z. Nayyer et al., "LBRO: Load Balancing for Resource Optimization in Edge Computing," in IEEE Access, vol. 10, pp. 97439-97449, 2022, doi: 10.1109/ACCESS.2022.3205741. (Year: 2022).*

(Continued)

*Primary Examiner* — Edward J Dudek, Jr.
(74) *Attorney, Agent, or Firm* — Schwegman Lundberg & Woessner, P.A.

(57) ABSTRACT

Various approaches for deploying and controlling distributed compute operations with the use of infrastructure processing units (IPUs) and similar network-addressable processing units are disclosed. A device for orchestrating functions in a network compute mesh is configured to receive, at a network-addressable processing unit of a network-addressable processing unit mesh from a requestor device, a computation request to execute a workflow with a set of objectives; query at least one other network-addressable processing units of the network-addressable processing unit mesh using the set of objectives, to determine aspects of available resources and data in the network-addressable processing unit mesh to apply to the workflow; transmit a list of recommended resources available to execute the workflow to the requestor device, the list of recommended resources being ranked based on at least one dimension of the resources; obtain a compute chain from the requestor device, the compute chain describing resource control transitions and data flow provided from the recommended resources and data in the network-addressable processing unit mesh; and schedule the execution of the workflow at one or more network-addressable processing units in the (Continued)

network-addressable processing unit mesh in accordance with the compute chain.

25 Claims, 12 Drawing Sheets

(51) Int. Cl.

| | |
|---|---|
| ***G06F 9/38*** | (2018.01) |
| ***G06F 9/48*** | (2006.01) |
| ***G06F 9/54*** | (2006.01) |
| ***G06F 11/07*** | (2006.01) |
| ***G06F 12/0846*** | (2016.01) |
| ***G06F 12/0873*** | (2016.01) |
| ***H04L 9/40*** | (2022.01) |
| ***H04L 67/10*** | (2022.01) |
| ***H04L 67/1087*** | (2022.01) |
| ***H04L 67/12*** | (2022.01) |
| ***H04L 67/63*** | (2022.01) |
| *H04L 41/5003* | (2022.01) |

(52) U.S. Cl.

CPC .......... *G06F 9/4881* (2013.01); *G06F 9/5038* (2013.01); *G06F 9/505* (2013.01); *G06F 9/5072* (2013.01); *G06F 9/5077* (2013.01); *G06F 9/5083* (2013.01); *G06F 9/54* (2013.01); *G06F 11/0793* (2013.01); *G06F 12/0851* (2013.01); *G06F 12/0873* (2013.01); *H04L 63/0876* (2013.01); *H04L 63/12* (2013.01); *H04L 67/10* (2013.01); *H04L 67/1091* (2013.01); *H04L 67/12* (2013.01); *H04L 41/5003* (2013.01)

(56) References Cited

U.S. PATENT DOCUMENTS

| | | | | |
|---|---|---|---|---|
| 7,861,246 | B2 * | 12/2010 | Lu | G06F 9/5072 709/201 |
| 9,363,087 | B2 | 6/2016 | Hawblitzel et al. | |
| 9,811,380 | B1 | 11/2017 | Martin et al. | |
| 9,906,493 | B1 | 2/2018 | Rodgers et al. | |
| 10,044,696 | B2 | 8/2018 | Walker et al. | |
| 10,389,800 | B2 | 8/2019 | Blainey et al. | |
| 11,210,218 | B1 | 12/2021 | Tavallaei et al. | |
| 11,288,096 | B2 | 3/2022 | Ugale et al. | |
| 11,675,630 | B2 | 6/2023 | Behar et al. | |
| 11,687,376 | B2 | 6/2023 | Cheng et al. | |
| 11,924,060 | B2 | 3/2024 | Smith et al. | |
| 2009/0279701 | A1 | 11/2009 | Moisand et al. | |
| 2011/0213508 | A1 | 9/2011 | Mandagere et al. | |
| 2011/0239220 | A1 | 9/2011 | Gibson et al. | |
| 2013/0261826 | A1 | 10/2013 | Mandagere et al. | |
| 2014/0143781 | A1 | 5/2014 | Yao | |
| 2015/0081893 | A1 | 3/2015 | Chadwell et al. | |
| 2015/0089507 | A1 * | 3/2015 | Nagao | G06F 9/5072 718/102 |
| 2015/0200854 | A1 | 7/2015 | Buchnik et al. | |
| 2015/0229582 | A1 | 8/2015 | Zhu et al. | |
| 2015/0268985 | A1 | 9/2015 | Jokinen et al. | |
| 2015/0350089 | A1 | 12/2015 | Wang et al. | |
| 2016/0004571 | A1 | 1/2016 | Smith | |
| 2016/0350157 | A1 | 12/2016 | Necas | |
| 2016/0380819 | A1 | 12/2016 | Burger | |
| 2017/0286122 | A1 | 10/2017 | Wu et al. | |
| 2018/0285766 | A1 | 10/2018 | Shen et al. | |
| 2018/0373863 | A1 | 12/2018 | Domke | |
| 2019/0034716 | A1 | 1/2019 | Kamarol et al. | |
| 2019/0043201 | A1 | 2/2019 | Strong et al. | |
| 2019/0116128 | A1 | 4/2019 | Guo et al. | |
| 2019/0319807 | A1 | 10/2019 | Fairfax et al. | |
| 2019/0327328 | A1 | 10/2019 | Smith et al. | |
| 2019/0370076 | A1 | 12/2019 | Behar et al. | |
| 2019/0370084 | A1 | 12/2019 | Behar et al. | |
| 2020/0065098 | A1 | 2/2020 | Parandeh Afshar et al. | |
| 2020/0065290 | A1 | 2/2020 | Natu | |
| 2020/0136906 | A1 | 4/2020 | Guim Bernat et al. | |
| 2020/0250003 | A1 | 8/2020 | Yang et al. | |
| 2020/0285523 | A1 * | 9/2020 | Guim Bernat | G06F 9/5044 |
| 2020/0372013 | A1 | 11/2020 | Lee et al. | |
| 2020/0394045 | A1 * | 12/2020 | Iwata | G06F 9/4881 |
| 2021/0011765 | A1 | 1/2021 | Doshi et al. | |
| 2021/0097108 | A1 | 4/2021 | Goyal et al. | |
| 2021/0109785 | A1 | 4/2021 | Prabhakaran et al. | |
| 2021/0200592 | A1 | 7/2021 | Guim et al. | |
| 2022/0046670 | A1 | 2/2022 | Lin | |
| 2022/0164242 | A1 | 5/2022 | Sui et al. | |
| 2022/0206849 | A1 | 6/2022 | Guim Bernat et al. | |
| 2022/0286481 | A1 | 9/2022 | Shaw et al. | |
| 2022/0400085 | A1 | 12/2022 | Ananthanarayanan et al. | |
| 2023/0004433 | A1 | 1/2023 | Kan et al. | |
| 2023/0132992 | A1 | 5/2023 | Bernat et al. | |
| 2023/0133020 | A1 | 5/2023 | Sakalley et al. | |
| 2023/0134683 | A1 | 5/2023 | Carranza et al. | |
| 2023/0135645 | A1 | 5/2023 | Guim Bernat et al. | |
| 2023/0135938 | A1 | 5/2023 | Carranza et al. | |
| 2023/0136612 | A1 | 5/2023 | Doshi et al. | |
| 2023/0136615 | A1 | 5/2023 | Guim Bernat et al. | |
| 2023/0137879 | A1 | 5/2023 | Alam et al. | |
| 2023/0140252 | A1 | 5/2023 | Carranza et al. | |
| 2023/0199440 | A1 | 6/2023 | Lee et al. | |
| 2023/0342478 | A1 | 10/2023 | Ranganathan et al. | |
| 2023/0401099 | A1 | 12/2023 | Bruno et al. | |
| 2023/0409233 | A1 | 12/2023 | Sheeley et al. | |
| 2024/0020173 | A1 | 1/2024 | Chatterjee | |
| 2024/0031221 | A1 | 1/2024 | Rajagopalan et al. | |
| 2024/0112076 | A1 * | 4/2024 | Jain | G06F 9/3802 |
| 2024/0127392 | A1 | 4/2024 | Hughes et al. | |

OTHER PUBLICATIONS

Hu, Shuihai, "Deadlocks in Datacenter Networks: Why Do They Form, and How to Avoid Them", HotNets-XV, (Nov. 2016), 7 pgs.

Kumar, Gautam, "Swift: Delay is Simple and Effective for Congestion Control in the Datacenter", SIGCOMM '20, (Aug. 2020), 15 pgs.

Mittal, Radhika, "Timely: RTT-Based Congestion Control for the Data Center", SIGCOMM, (Aug. 2015), 14 pgs.

"Elastics.cloud First to DemonstrateCXLtm Enabled Symmetric Multi HostMemory Pooling and Expansion", [Online]. Retrieved from the Internet https www.prnewswire.com news-releases elasticscloud-first-to-demonstrate-cxl-enabled-symmetric-multi-host-memory-pooling-and-expansion-301633093.html, Sep. 26, 2022, 3 pages.

"The GigaIO Fabrex Memory Fabric Memory Pooling Overview", [Online]. Retrieved from the Internet https gigaio.com project memory-pooling-overview , Feb. 2020, 8 pages.

"Marvell Announces Innovative CXL Development Platform for Multi-Host Memory Pooling", [Online]. Retrieved from the Internet https www.prnewswire.com news-releases marvell-announces-innovative-cxl-development-platform-for-multi-host-memory-pooling-301675043.html, Nov. 10, 2022, 3 pages.

"Intel Threading Building Blocks Tutorial v1.21", Intel Corporation, Oct. 27, 2011, 90 pages.

"U.S. Appl. No. 18/090,749, Non Final Office Action mailed Jan. 8, 2026", 11 pgs.

"U.S. Appl. No. 18/090,720, Non Final Office Action mailed Jan. 28, 2026", 13 pgs.

"U.S. Appl. No. 18/090,786, Non Final Office Action mailed Jan. 28, 2026", 21 pgs.

"U.S. Appl. No. 18/090,701, Non Final Office Action mailed Feb. 9, 2026", 9 pgs.

"U.S. Appl. No. 18/090,764, Non Final Office Action mailed Feb. 11, 2026", 15 pgs.

"U.S. Appl. No. 18/090,813, Non Final Office Action mailed Feb. 13, 2026", 17 pgs.

"U.S. Appl. No. 18/090,653, Non Final Office Action mailed Feb. 20, 2026", 25 pgs.

(56) References Cited

OTHER PUBLICATIONS

Ananthanarayanan, Ganesh, "Reining in the Outliers in Map Reduce Clusters using Mantri", 9th USENIX Symposium on Operating Systems Design and Implementation OSDI 10., 2010, 14 pages.

Moore, Andrew, "IPU-Based Cloud Infrastructure: The Fulcrum for Digital Business" Intel Corporation, 2021, 6 pages.

"U.S. Appl. No. 18/090,749, Response filed Apr. 7, 2026 to Non Final Office Action mailed Jan. 8, 2026", 13 pgs.

"U.S. Appl. No. 18/090,862, Notice of Allowance mailed Apr. 13, 2026", 11 pgs.

"U.S. Appl. No. 18/090,720, Response filed Apr. 16, 2026 to Non Final Office Action mailed Jan. 28, 2026", 12 pgs.

"U.S. Appl. No. 18/090,842, Non Final Office Action mailed Apr. 20, 2026", 17 pgs.

"U.S. Appl. No. 18/090,786, Response filed Apr. 23, 2026 to Non Final Office Action mailed Jan. 28, 2026", 11 pgs.

"U.S. Appl. No. 18/090,862, Corrected Notice of Allowability mailed Apr. 27, 2026", 2 pgs.

"U.S. Appl. No. 18/090,749, Final Office Action mailed May 4, 2026", 11 pgs.

"U.S. Appl. No. 18/090,701, Response filed May 7, 2026 to Non Final Office Action mailed Feb. 9, 2026", 12 pgs.

"U.S. Appl. No. 18/090,764, Response filed May 7, 2026 to Non Final Office Action mailed Feb. 11, 2026", 11 pgs.

"U.S. Appl. No. 18/090,813, Response filed May 13, 2026 to Non Final Office Action mailed Feb. 13, 2026", 9 pgs.

"U.S. Appl. No. 18/090,653, Response filed May 20, 2026 to Non Final Office Action mailed Feb. 20, 2026", 14 pgs.

"U.S. Appl. No. 18/090,786, Notice of Allowance mailed May 22, 2026", 9 pgs.

"U.S. Appl. No. 18/090,701, Final Office Action mailed May 29, 2026", 12 pgs.

"U.S. Appl. No. 18/090,764, Final Office Action mailed Jun. 3, 2026", 8 pgs.

"U.S. Appl. No. 18/090,813, Notice of Allowance mailed Jun. 9, 2026", 9 pgs.

"U.S. Appl. No. 18/090,720, Final Office Action mailed Jul. 1, 2026", 14 pgs.

* cited by examiner

| Tiers | On-Premise Edge (210, 220) | | | | 230 | | 240 | | 250 | 260 |
|---|---|---|---|---|---|---|---|---|---|---|
| | Intelligent Sensor/GW | | Intelligent Edge | | Network Edge | | DC Edge | | Core DC / Public Cloud | |
| Network Latencies (Wire Round Trip) | <1ms | | <1ms | | 1-5ms | | 5ms+1-2ms (every 100kms) | | 5ms+5 ms (every 400kms) | |
| Deployment Requirements | Compute Available Power: <50W Form Factor: Small Box Thermals: NEBs Mgmt.: Remote | | Compute Available Power: ~10KW Form Factor: Rack(s) Thermals: NEBS Or Standard DC Mgmt.: Remote | | Compute Available Power: <600W Form Factor: Pizza Box Thermals: NEBS Mgmt.: Remote | | Compute Available Power: 9KW/rack/1KW Sqm Form Factor: Rack(s) Thermals: NEBS or Standard DC Mgmt.: Remote | | Standard Data Center (DC) | |
| Where, What & Why | Use Case | KPI | Use Case | KPI | Use Case | KPI | Use Case | KPI | Use Case | KPI |
| | Intelligent Transportation | Data Privacy, Backhaul Traffic, Savings, Reliability | AR/VR | Latency. Backhaul Traffic Savings, Network Scalability | Intelligent Transportation | Data Privacy, Backhaul Traffic Savings, Reliability Throughput Latency | Intelligent Transportation | Data Privacy | CDN | Backhaul Traffic Savings, Throughput |
| | V2V | Latency | Retail | Data Privacy, Backhaul Traffic Savings, Reliability | V2V | Latency | Video Analytics | Same as Int. Transp. | Storage GW | Same as CDN |
| | Retail | Same As Int. Transp. | RT Streaming Healthcare | Same as AR/VR Access to Services | Video Analytics | Same as Int. Transp. | Drone/IoT | Same As Int. Transp. | | |
| | Video Analytics | Same as Int. Transp. | | | Drone/IoT | Same as Int. Transp. | Healthcare | Access to Services | | |
| | | | | | Rural | Access to Services | CDN & Storage | Backhaul Traffic Savings, Throughtput | | |
| | | | | | | | Faas | Latency | | |
| | | | | | | | AR/VR/MR | Latency | | |

FIG. 3

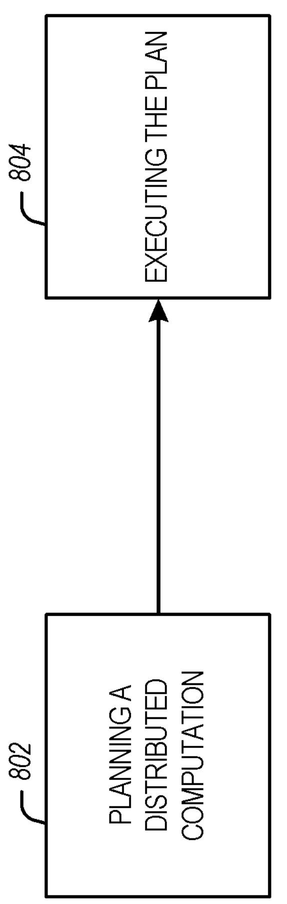
FIG. 8

| LOGICAL ID | COST | WEIGHTED DISTANCE | LATENCY | CAPACITY |
|---|---|---|---|---|
| ID-0x0118 | 0.03 | 25.2 HOPS | 331 μSEC | 0.27 QPS |
| ID-0x2304 | 0.42 | 7.3 HOPS | 27 μSEC | 5.13 QPS |
| ID-0x0764 | 1.06 | 8.6 HOPS | 38 μSEC | 3.41 QPS |
| ... | ... | ... | ... | ... |

| LOGICAL ID | CAPACITY | WEIGHTED DISTANCE | LATENCY | COST |
|---|---|---|---|---|
| ID-0x0147 | 21 TOPS | 14.2 HOPS | 433 μSEC | 0.47 |
| ID-0x5704 | 7.9 TOPS | 1.3 HOPS | 3103 μSEC | 1.03 |
| ID-0x5844 | 4.2 TOPS | 4.6 HOPS | 88 μSEC | 0.19 |
| ... | ... | ... | ... | ... |

| LOGICAL ID | LATENCY | COST | WEIGHTED DISTANCE | CAPACITY |
|---|---|---|---|---|
| ID-0x0344 | 41 μSEC | 5.03 | 24.2 HOPS | 0.27 TPS |
| ID-0x2304 | 53 μSEC | 0.93 | 7.3 HOPS | 5.13 TPS |
| ID-0x1554 | 98 μSEC | 1.16 | 8.6 HOPS | 3.41 TPS |
| ... | ... | ... | ... | ... |

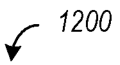
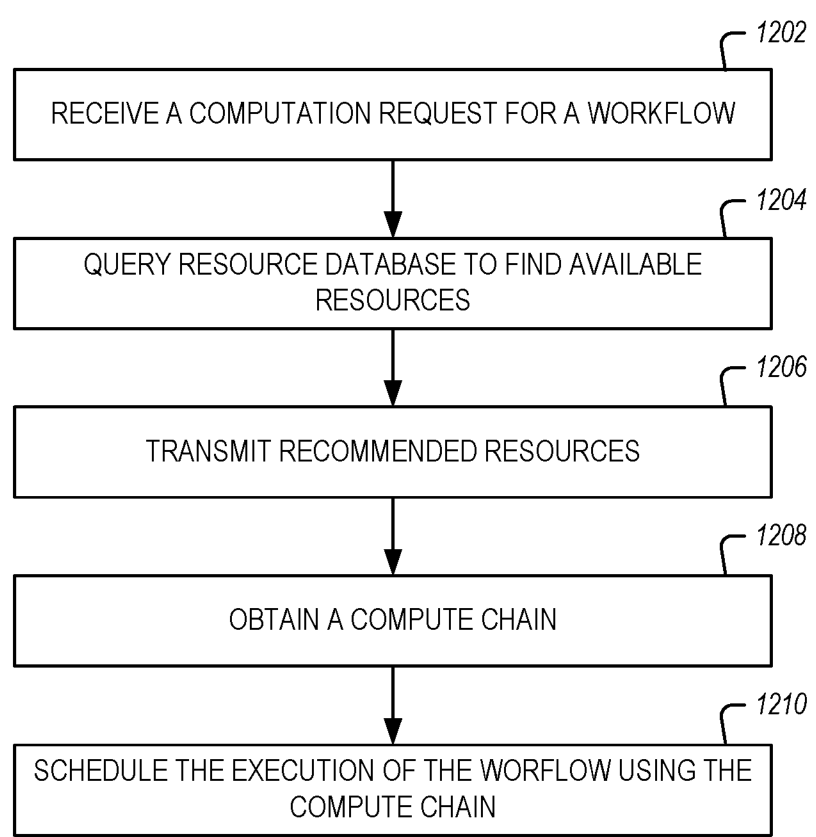
FIG. 12

FEDERATED DISTRIBUTION OF COMPUTATION AND OPERATIONS USING NETWORKED PROCESSING UNITS

PRIORITY CLAIM

This application claims the benefit of priority to U.S. Provisional Patent Application No. 63/425,857, filed Nov. 16, 2022, and titled "COORDINATION OF DISTRIBUTED NETWORKED PROCESSING UNITS", which is incorporated herein by reference in its entirety.

TECHNICAL FIELD

Embodiments described herein generally relate to data processing, network communication, and communication system implementations of distributed computing, including the implementations with the use of networked processing units (or network-addressable processing units) such as infrastructure processing units (IPUs) or data processing units (DPUs).

BACKGROUND

System architectures are moving to highly distributed multi-edge and multi-tenant deployments. Deployments may have different limitations in terms of power and space. Deployments also may use different types of compute, acceleration and storage technologies in order to overcome these power and space limitations. Deployments also are typically interconnected in tiered and/or peer-to-peer fashion, in an attempt to create a network of connected devices and edge appliances that work together.

Edge computing, at a general level, has been described as systems that provide the transition of compute and storage resources closer to endpoint devices at the edge of a network (e.g., consumer computing devices, user equipment, etc.). As compute and storage resources are moved closer to endpoint devices, a variety of advantages have been promised such as reduced application latency, improved service capabilities, improved compliance with security or data privacy requirements, improved backhaul bandwidth, improved energy consumption, and reduced cost. However, many deployments of edge computing technologies—especially complex deployments for use by multiple tenants—have not been fully adopted.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 3 depicts additional characteristics of respective deployments tiers in a distributed edge computing environment, according to an example;

FIG. 8 is a block diagram illustrating the general flow for distributing computation, according to an example;

FIG. 12 is a flowchart illustrating a method for orchestrating functions in a network compute mesh, according to an example.

DETAILED DESCRIPTION

Figure 1:
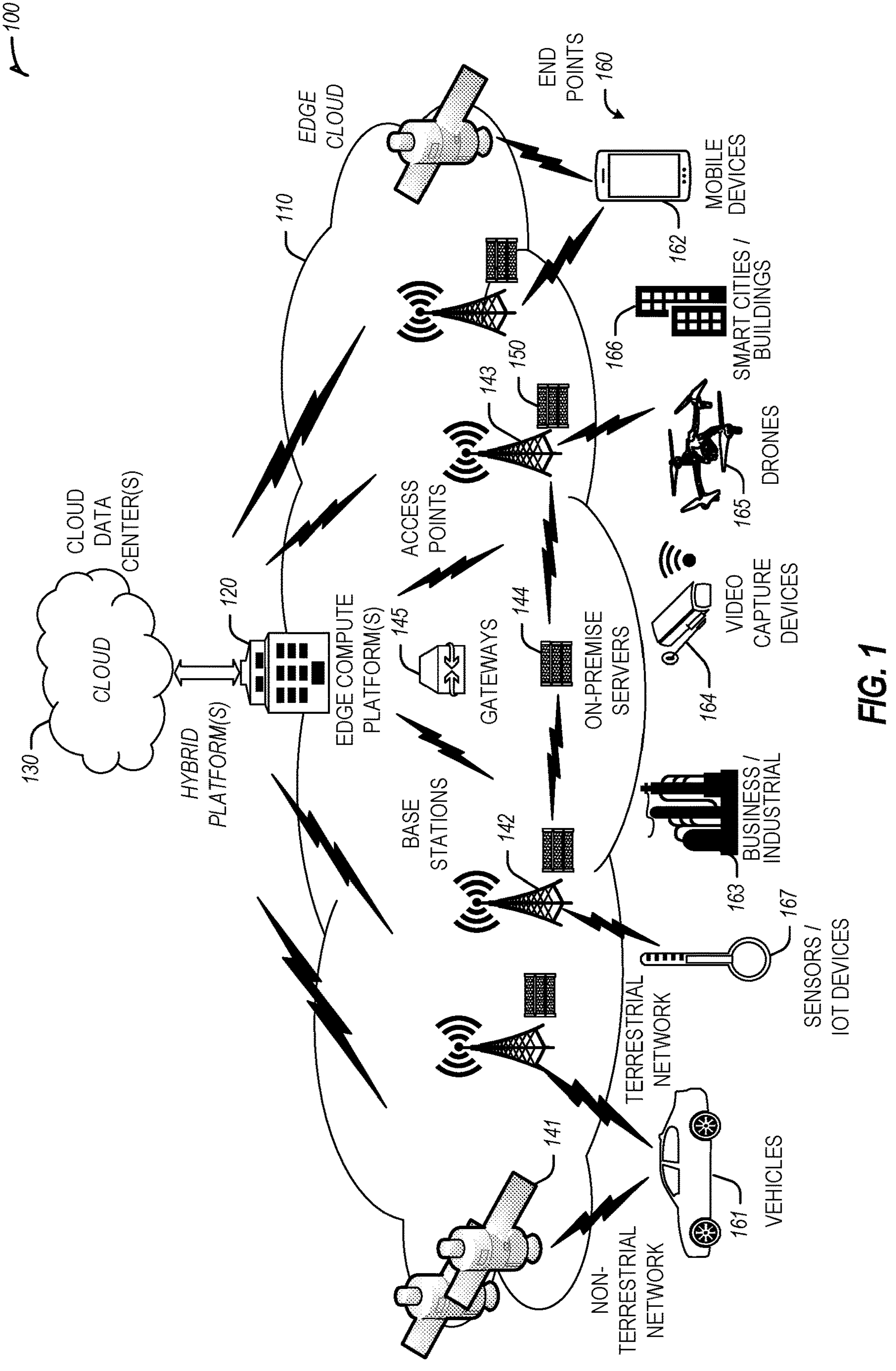
FIG. 1 illustrates an overview of a distributed edge computing environment, according to an example.

Various approaches for providing distributed computation in an edge computing setting are discussed herein. It is frequently necessary to migrate workloads or to redistribute computational work between execution resources. Some execution resources may be overloaded while others are idle or underutilized. This imbalance represents inefficiencies. Edge nodes provide an execution vehicle. An edge node may be a machine, a virtual machine executing on a host, a container, a process, or the like. At each edge node, different conditions may constrain the computations that can be performed. For example, some nodes may be green-powered hosts and consequently may have limited ability to process or to expand their loading because of fluctuating power availability. Other nodes may be passively cooled and therefore have thermal envelopes that similarly limit what they can perform. Even without hard power limits or thermal caps, there may be other constraints. For instance, special purpose accelerators that can support significantly high capacity (i.e., throughput, user/request scale, etc.) for specialized computations may not be universally available in the local cluster of a given edge node. In sparsely and irregularly connected edge nodes that are not fully connected, communication routes represent a high amount of overhead. Additionally, due to the non-connectivity, edge nodes may lack an awareness of what computation capacity and ability is available for computations and what they may be able to distribute across edge tiers and possibly into back end datacenters.

Some existing implementations attempt to store work distribution data (e.g., resource allocation, workload assignments, etc.) in a central data store. Other implementations attempt to store the work in a distributed database or other distributed data store, for example by using techniques similar to those available in named-function networking (NFN) or information-centric networking (ICN). However, if the information is amassed at one point in time through various discovery operations, then it is difficult to ensure that the information is kept up to date. Because of the dynamic nature of edge computing where machine configurations, availabilities, network connectivity, and operating environments change over time causing irregular connectivity and distributed points of control, the ability to achieve optimal and timely distribution of work to where it can be most efficiently performed is very difficult. What is needed is an improved mechanism to distribute computation and data operations.

In various examples described herein, the logic that is used to distribute workloads and perform workload migration are managed by network-addressable processing units, networked processing units, a network switch, or other network-addressable component. For instance, a network-addressable processing units may monitor and orchestrate execution flow of a workloads between edge nodes in a network.

A network-addressable processing unit is a processing unit that has a unique network address and is able to process network traffic. A network-addressable processing unit may work in concert with other processing units on a compute node. For instance, a network-addressable processing unit may be integrated with a network interface card (NIC) and process network traffic for a general CPU. Although a network-addressable processing unit may provide network management facilities, a network-addressable processing unit may also be used to offload workloads from a CPU, expose functions to other network-addressable processing units, and orchestrate workflows between CPUs and network-addressable processing units on various compute nodes in the network compute mesh. In some implementations, a network-addressable processing unit may have a distinct separate network address from the host that the network-addressable processing unit is installed within so that the network-addressable processing unit is separately addressable from the host and can process network traffic that is not for the host. Multiple network-addressable processing units may coordinate in a network-addressable processing unit mesh.

Accordingly, the following describes coordinated, intelligent components to mapping computation workloads or tasks to computing resources through the agency of different network-addressable processing units or IPUs in order to optimize allocation and distribution. By offloading the coordination and orchestration to network-addressable processing unit or IPU-based systems, core CPUs are unburdened. Additionally, because of the proximity and interworking with network devices, network-addressable processing unit or IPU-based systems are able to adapt and dynamically adjust to changing network conditions. The result is a system that is able to configure a combination of memory and compute resources for servicing client workloads while increasing service speed. Although many of the techniques may be implemented by a switch, orchestrator, or controller, the techniques are also suited for use by network-addressable processing units such as infrastructure processing units (IPUs).

Additional implementation details for providing workload management and migration in an edge computing network, implemented by way of a network switch or IPUs are provided among provided in FIGS. 8 to 11, below. General implementation details of an edge computing network and the use of distributed networked processing units in such a network is provided in FIGS. 1 to 7, below.

Distributed Edge Computing and Networked Processing Units

FIG. 1 is a block diagram 100 showing an overview of a distributed edge computing environment, which may be adapted for implementing the present techniques for distributed networked processing units. As shown, the edge cloud 110 is established from processing operations among one or more edge locations, such as a satellite vehicle 141, a base station 142, a network access point 143, an on premise server 144, a network gateway 145, or similar networked devices and equipment instances. These processing operations may be coordinated by one or more edge computing platforms 120 or systems that operate networked processing units (e.g., IPUs, DPUs) as discussed herein.

The edge cloud 110 is generally defined as involving compute that is located closer to endpoints 160 (e.g., consumer and producer data sources) than the cloud 130, such as autonomous vehicles 161, user equipment 162, business and industrial equipment 163, video capture devices 164, drones 165, smart cities and building devices 166, sensors and IoT devices 167, etc. Compute, memory, network, and storage resources that are offered at the entities in the edge cloud 110 can provide ultra-low or improved latency response times for services and functions used by the endpoint data sources as well as reduce network backhaul traffic from the edge cloud 110 toward cloud 130 thus improving energy consumption and overall network usages among other benefits.

Compute, memory, and storage are scarce resources, and generally decrease depending on the edge location (e.g., fewer processing resources being available at consumer end point devices than at a base station or a central office data center). As a general design principle, edge computing attempts to minimize the number of resources needed for network services, through the distribution of more resources that are located closer both geographically and in terms of in-network access time.

Figure 2:
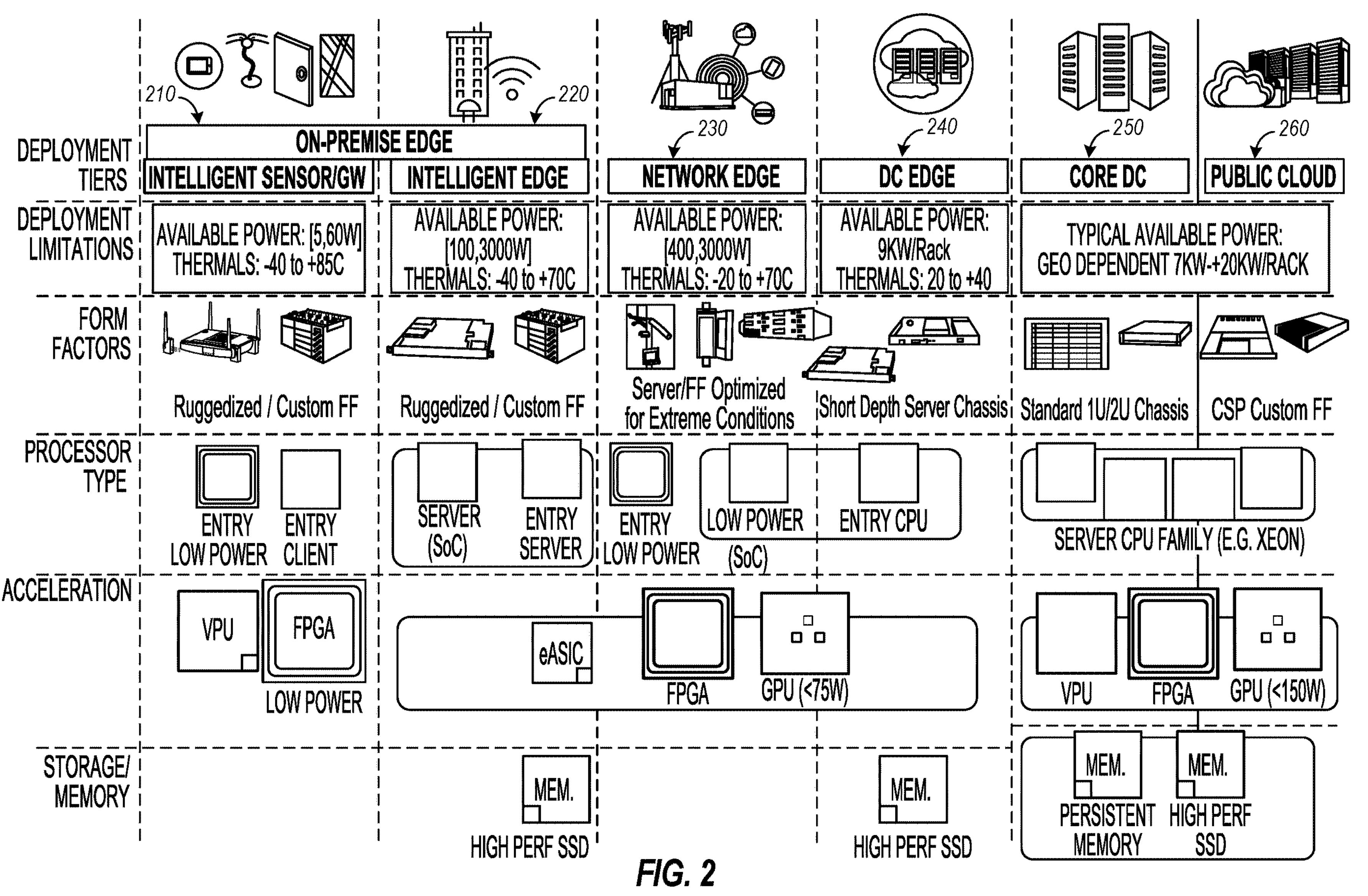
FIG. 2 depicts computing hardware provided among respective deployment tiers in a distributed edge computing environment, according to an example.

FIG. 2 depicts examples of computing hardware provided among respective deployment tiers in a distributed edge computing environment. Here, one tier at an on-premise edge system is an intelligent sensor or gateway tier 210, which operates network devices with low power and entry-level processors and low-power accelerators. Another tier at an on-premise edge system is an intelligent edge tier 220, which operates edge nodes with higher power limitations and may include a high-performance storage.

Further in the network, a network edge tier 230 operates servers including form factors optimized for extreme conditions (e.g., outdoors). A data center edge tier 240 operates additional types of edge nodes such as servers, and includes increasingly powerful or capable hardware and storage technologies. Still further in the network, a core data center tier 250 and a public cloud tier 260 operate compute equipment with the highest power consumption and largest configuration of processors, acceleration, storage/memory devices, and highest throughput network.

In each of these tiers, various forms of Intel® processor lines are depicted for purposes of illustration; it will be understood that other brands and manufacturers of hardware will be used in real-world deployments. Additionally, it will be understood that additional features or functions may exist among multiple tiers. One such example is connectivity and infrastructure management that enable a distributed IPU architecture, that can potentially extend across all of tiers 210, 220, 230, 240, 250, 260. Other relevant functions that may extend across multiple tiers may relate to security features, domain or group functions, and the like.

FIG. 3 depicts additional characteristics of respective deployment tiers in a distributed edge computing environment, based on the tiers discussed with reference to FIG. 2. This figure depicts additional network latencies at each of the tiers 210, 220, 230, 240, 250, 260, and the gradual increase in latency in the network as the compute is located at a longer distance from the edge endpoints. Additionally, this figure depicts additional power and form factor constraints, use cases, and key performance indicators (KPIs).

With these variations and service features in mind, edge computing within the edge cloud 110 may provide the ability to serve and respond to multiple applications of the use cases in real-time or near real-time and meet ultra-low latency requirements. As systems have become highly-distributed, networking has become one of the fundamental pieces of the architecture that allow achieving scale with resiliency, security, and reliability. Networking technologies have evolved to provide more capabilities beyond pure network routing capabilities, including to coordinate quality of service, security, multi-tenancy, and the like. This has also been accelerated by the development of new smart network adapter cards and other type of network derivatives that incorporated capabilities such as ASICs (application-specific integrated circuits) or FPGAs (field programmable gate arrays) to accelerate some of those functionalities (e.g., remote attestation).

In these contexts, networked processing units have begun to be deployed at network cards (e.g., smart NICs), gateways, and the like, which allow direct processing of network workloads and operations. One example of a networked processing unit is an infrastructure processing unit (IPU), which is a programmable network device that can be extended to provide compute capabilities with far richer functionalities beyond pure networking functions. Another example of a network processing unit is a data processing unit (DPU), which offers programmable hardware for performing infrastructure and network processing operations. The following discussion refers to functionality applicable to an IPU configuration, such as that provided by an Intel® line of IPU processors. However, it will be understood that functionality will be equally applicable to DPUs and other types of networked processing units provided by ARM®, Nvidia®, and other hardware OEMs.

Figure 4:
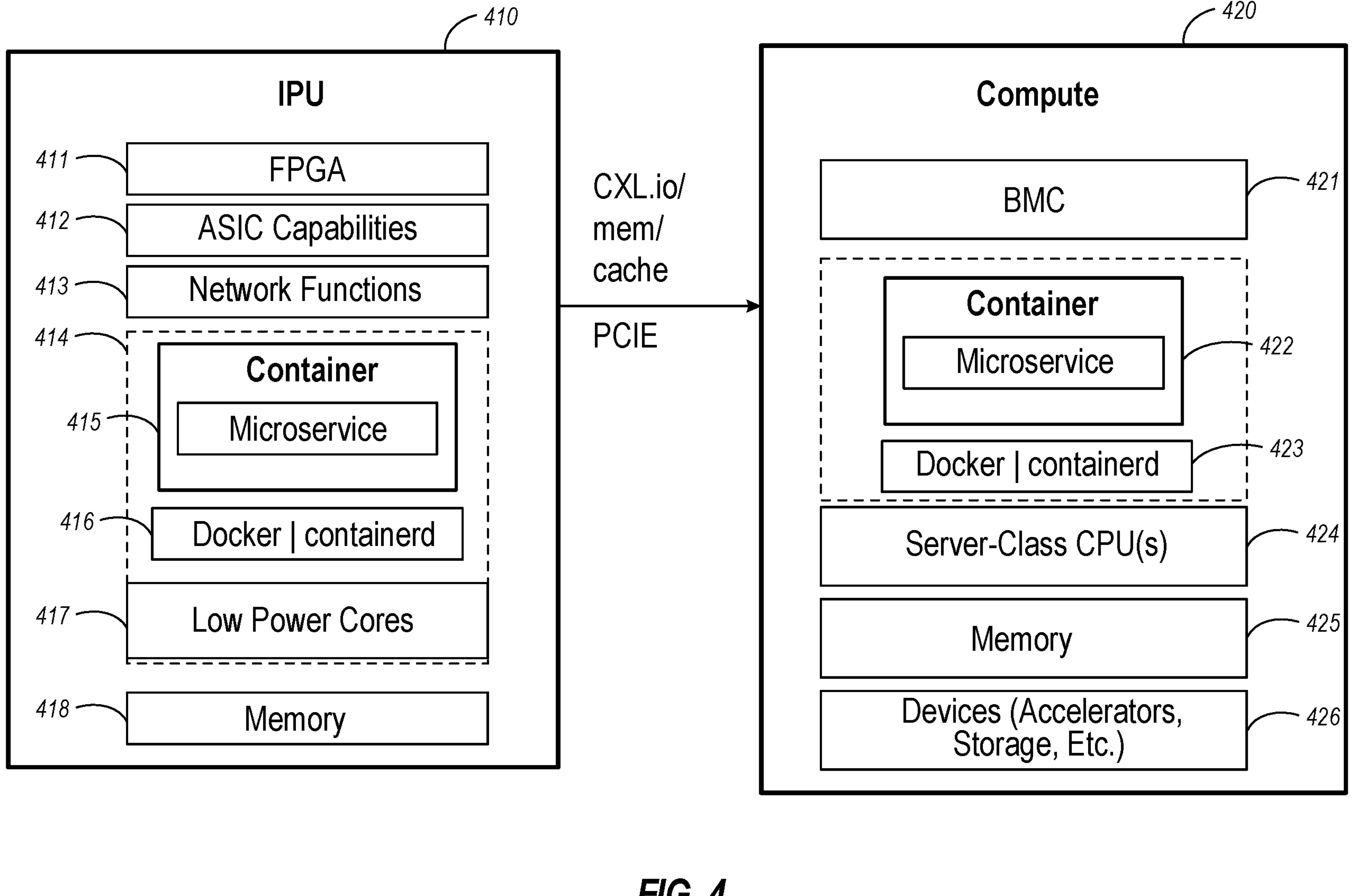
FIG. 4 depicts a computing system architecture including a compute platform and a network processing platform provided by an infrastructure processing unit, according to an example.

FIG. 4 depicts an example compute system architecture that includes a compute platform 420 and a network processing platform comprising an IPU 410. This architecture—and in particular the IPU 410—can be managed, coordinated, and orchestrated by the functionality discussed below, including with the functions described with reference to FIG. 6.

The main compute platform 420 is composed by typical elements that are included with a computing node, such as one or more CPUs 424 that may or may not be connected via a coherent domain (e.g., via Ultra Path Interconnect (UPI) or another processor interconnect); one or more memory units 425; one or more additional discrete devices 426 such as storage devices, discrete acceleration cards (e.g., a field-programmable gate array (FPGA), a visual processing unit (VPU), etc.); a baseboard management controller 421; and the like. The compute platform 420 may operate one or more containers 422 (e.g., with one or more microservices), within a container runtime 423 (e.g., Docker containerd). The IPU 410 operates as a networking interface and is connected to the compute platform 420 using an interconnect (e.g., using either PCIe or CXL). The IPU 410, in this context, can be observed as another small compute device that has its own: (1) Processing cores (e.g., provided by low-power cores 417), (2) operating system (OS) and cloud native platform 414 to operate one or more containers 415 and a container runtime 416; (3) Acceleration functions provided by an ASIC 411 or FPGA 412; (4) Memory 418; (5) Network functions provided by network circuitry 413; etc.

From a system design perspective, this arrangement provides important functionality. The IPU 410 is seen as a discrete device from the local host (e.g., the OS running in the compute platform CPUs 424) that is available to provide certain functionalities (networking, acceleration etc.). Those functionalities are typically provided via Physical or Virtual PCIe functions. Additionally, the IPU 410 is seen as a host (with its own IP etc.) that can be accessed by the infrastructure to setup an OS, run services, and the like. The IPU 410 sees all the traffic going to the compute platform 420 and can perform actions—such as intercepting the data or performing some transformation—as long as the correct security credentials are hosted to decrypt the traffic. Traffic going through the IPU goes to all the layers of the Open Systems Interconnection model (OSI model) stack (e.g., from physical to application layer). Depending on the features that the IPU has, processing may be performed at the transport layer only. However, if the IPU has capabilities to perform traffic intercept, then the IPU also may be able to intercept traffic at the traffic layer (e.g., intercept CDN traffic and process it locally).

Some of the use cases being proposed for IPUs and similar networked processing units include: to accelerate network processing; to manage hosts (e.g., in a data center); or to implement quality of service policies. However, most of functionalities today are focused at using the IPU at the local appliance level and within a single system. These approaches do not address how the IPUs could work together in a distributed fashion or how system functionalities can be divided among the IPUs on other parts of the system. Accordingly, the following introduces enhanced approaches for enabling and controlling distributed functionality among multiple networked processing units. This enables the extension of current IPU functionalities to work as a distributed set of IPUs that can work together to achieve stronger features such as, resiliency, reliability, etc.

Distributed Architectures of IPUs

Figure 5:
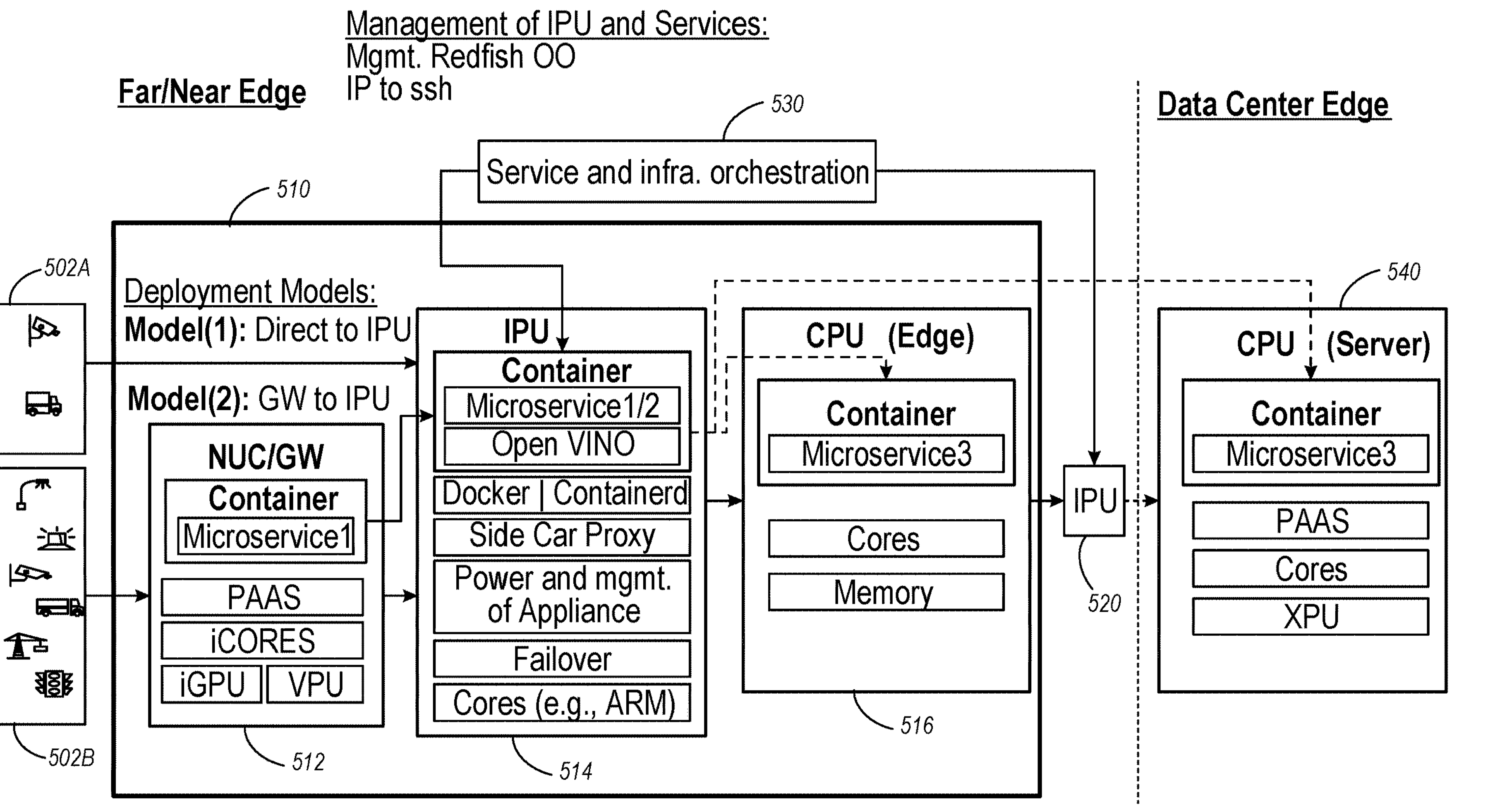
FIG. 5 depicts an infrastructure processing unit arrangement operating as a distributed network processing platform within network and data center edge settings, according to an example.

FIG. 5 depicts an IPU arrangement operating as a distributed network processing platform within network and data center edge settings. In a first deployment model of a computing environment 510, workloads or processing requests are directly provided to an IPU platform, such as directly to IPU 514. In a second deployment model of the computing environment 510, workloads or processing requests are provided to some intermediate processing device 512, such as a gateway or NUC (next unit of computing) device form factor, and the intermediate processing device 512 forwards the workloads or processing requests to the IPU 514. It will be understood that a variety of other deployment models involving the composability and coordination of one or more IPUs, compute units, network devices, and other hardware may be provided.

With the first deployment model, the IPU 514 directly receives data from use cases 502A. The IPU 514 operates one or more containers with microservices to perform processing of the data. As an example, a small gateway (e.g., a NUC type of appliance) may connect multiple cameras to an edge system that is managed or connected by the IPU 514. The IPU 514 may process data as a small aggregator of sensors that runs on the far edge, or may perform some level of inline or preprocessing and that sends payload to be further processed by the IPU or the system that the IPU connects.

With the second deployment model, the intermediate processing device 512 provided by the gateway or NUC receives data from use cases 502B. The intermediate processing device 512 includes various processing elements (e.g., CPU cores, GPUs), and may operate one or more microservices for servicing workloads from the use cases 502B. However, the intermediate processing device 512 invokes the IPU 514 to complete processing of the data.

In either the first or the second deployment model, the IPU 514 may connect with a local compute platform, such as that provided by a CPU 516 (e.g., Intel® Xeon CPU) operating multiple microservices. The IPU may also connect with a remote compute platform, such as that provided at a data center by CPU 540 at a remote server. As an example, consider a microservice that performs some analytical processing (e.g., face detection on image data), where the CPU 516 and the CPU 540 provide access to this same microservice. The IPU 514, depending on the current load of the CPU 516 and the CPU 540, may decide to forward the images or payload to one of the two CPUs. Data forwarding or processing can also depend on other factors such as SLA for latency or performance metrics (e.g., perf/watt) in the two systems. As a result, the distributed IPU architecture may accomplish features of load balancing.

The IPU in the computing environment 510 may be coordinated with other network-connected IPUs. In an example, a Service and Infrastructure orchestration manager 530 may use multiple IPUs as a mechanism to implement advanced service processing schemes for the user stacks. This may also enable implementing of system functionalities such as failover, load balancing etc.

In a distributed architecture example, IPUs can be arranged in the following non-limiting configurations. As a first configuration, a particular IPU (e.g., IPU 514) can work with other IPUs (e.g., IPU 520) to implement failover mechanisms. For example, an IPU can be configured to forward traffic to service replicas that runs on other systems when a local host does not respond.

As a second configuration, a particular IPU (e.g., IPU 514) can work with other IPUs (e.g., IPU 520) to perform load balancing across other systems. For example, consider a scenario where CDN traffic targeted to the local host is forwarded to another host in case that I/O or compute in the local host is scarce at a given moment.

As a third configuration, a particular IPU (e.g., IPU 514) can work as a power management entity to implement advanced system policies. For example, consider a scenario where the whole system (e.g., including CPU 516) is placed in a C6 state (a low-power/power-down state available to a processor) while forwarding traffic to other systems (e.g., IPU 520) and consolidating it.

As will be understood, fully coordinating a distributed IPU architecture requires numerous aspects of coordination and orchestration. The following examples of system architecture deployments provide discussion of how edge computing systems may be adapted to include coordinated IPUs, and how such deployments can be orchestrated to use IPUs at multiple locations to expand to the new envisioned functionality.

Distributed IPU Functionality

Figure 6:
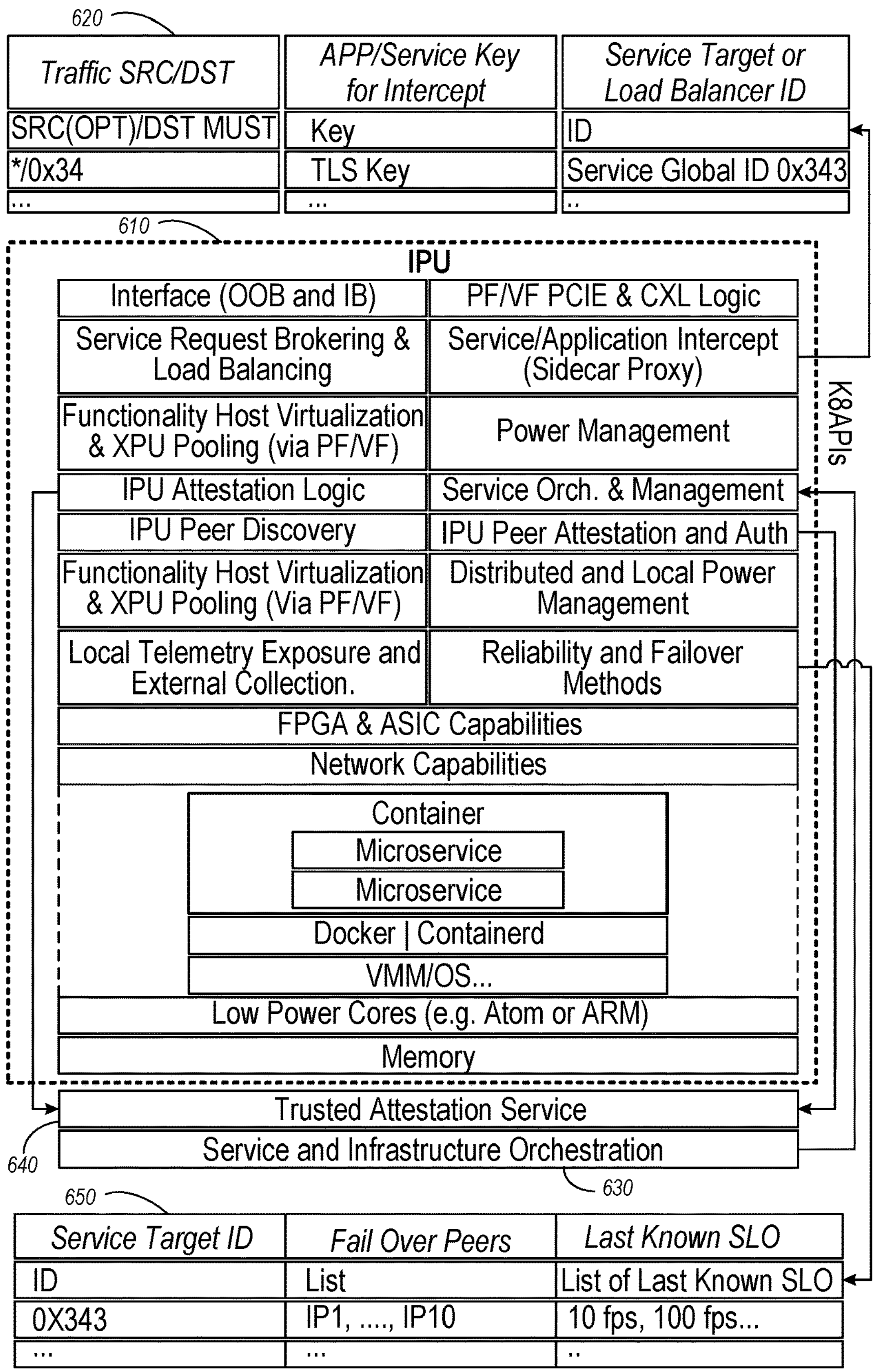
FIG. 6 depicts functional components of an infrastructure processing unit and related services, according to an example.

An arrangement of distributed IPUs offers a set of new functionalities to enable IPUs to be service focused. FIG. 6 depicts functional components of an IPU 610, including services and features to implement the distributed functionality discussed herein. It will be understood that some or all of the functional components provided in FIG. 6 may be distributed among multiple IPUs, hardware components, or platforms, depending on the particular configuration and use case involved.

In the block diagram of FIG. 6, a number of functional components are operated to manage requests for a service running in the IPU (or running in the local host). As discussed above, IPUs can either run services or intercept requests arriving to services running in the local host and perform some action. In the latter case, the IPU can perform the following types of actions/functions (provided as a non-limiting examples).

Peer Discovery. In an example, each IPU is provided with Peer Discovery logic to discover other IPUs in the distributed system that can work together with it. Peer Discovery logic may use mechanisms such as broadcasting to discover other IPUs that are available on a network. The Peer Discovery logic is also responsible to work with the Peer Attestation and Authentication logic to validate and authenticate the peer IPU's identity, determine whether they are trustworthy, and whether the current system tenant allows the current IPU to work with them. To accomplish this, an IPU may perform operations such as: retrieve a proof of identity and proof of attestation; connect to a trusted service running in a trusted server; or, validate that the discovered system is trustworthy. Various technologies (including hardware components or standardized software implementations) that enable attestation, authentication, and security may be used with such operations.

Peer Attestation. In an example, each IPU provides interfaces to other IPUs to enable attestation of the IPU itself. IPU Attestation logic is used to perform an attestation flow within a local IPU in order to create the proof of identity that will be shared with other IPUs. Attestation here may integrate previous approaches and technologies to attest a compute platform. This may also involve the use of trusted attestation service 640 to perform the attestation operations.

Functionality Discovery. In an example, a particular IPU includes capabilities to discover the functionalities that peer IPUs provide. Once the authentication is done, the IPU can determine what functionalities that the peer IPUs provide (using the IPU Peer Discovery Logic) and store a record of such functionality locally. Examples of properties to discover can include: (i) Type of IPU and functionalities provided and associated KPIs (e.g. performance/watt, cost etc.); (ii) Available functionalities as well as possible functionalities to execute under secure enclaves (e.g., enclaves provided by Intel® SGX or TDX technologies); (iii) Current services that are running on the IPU and on the system that can potentially accept requests forwarded from this IPU; or (iv) Other interfaces or hooks that are provided by an IPU, such as: Access to remote storage; Access to a remote VPU; Access to certain functions. In a specific example, service may be described by properties such as: UUID; Estimated performance KPIs in the host or IPU; Average performance provided by the system during the N units of time (or any other type of indicator); and like properties.

Service Management. The IPU includes functionality to manage services that are running either on the host compute platform or in the IPU itself. Managing (orchestration) services includes performance service and resource orchestration for the services that can run on the IPU or that the IPU can affect. Two type of usage models are envisioned:

External Orchestration Coordination. The IPU may enable external orchestrators to deploy services on the IPU compute capabilities. To do so, an IPU includes a component similar to K8 compatible APIs to manage the containers (services) that run on the IPU itself. For example, the IPU may run a service that is just providing content to storage connected to the platform. In this case, the orchestration entity running in the IPU may manage the services running in the IPU as it happens in other systems (e.g. keeping the service level objectives).

Further, external orchestrators can be allowed to register to the IPU that services are running on the host may require to broker requests, implement failover mechanisms and other functionalities. For example, an external orchestrator may register that a particular service running on the local compute platform is replicated in another edge node managed by another IPU where requests can be forwarded.

In this latter use case, external orchestrators may provide to the Service/Application Intercept logic the inputs that are needed to intercept traffic for these services (as typically is encrypted). This may include properties such as a source and destination traffic of the traffic to be intercepted, or the key to use to decrypt the traffic. Likewise, this may be needed to terminate TLS to understand the requests that arrive to the IPU and that the other logics may need to parse to take actions. For example, if there is a CDN read request the IPU may need to decrypt the packet to understand that network packet includes a read request and may redirect it to another host based on the content that is being intercepted. Examples of Service/Application Intercept information is depicted in table 620 in FIG. 6.

External Orchestration Implementation. External orchestration can be implemented in multiple topologies. One supported topology includes having the orchestrator managing all the IPUs running on the backend public or private cloud. Another supported topology includes having the orchestrator managing all the IPUs running in a centralized edge appliance. Still another supported topology includes having the orchestrator running in another IPU that is working as the controller or having the orchestrator running distributed in multiple other IPUs that are working as controllers (master/primary node), or in a hierarchical arrangement.

Functionality for Broker requests. The IPU may include Service Request Brokering logic and Load Balancing logic to perform brokering actions on arrival for requests of target services running in the local system. For instance, the IPU may decide to see if those requests can be executed by other peer systems (e.g., accessible through Service and Infrastructure Orchestration 630). This can be caused, for example, because load in the local systems is high. The local IPU may negotiate with other peer IPUs for the possibility to forward the request. Negotiation may involve metrics such as cost. Based on such negotiation metrics, the IPU may decide to forward the request.

Functionality for Load Balancing requests. The Service Request Brokering and Load Balancing logic may distribute requests arriving to the local IPU to other peer IPUs. In this case, the other IPUs and the local IPU work together and do not necessarily need brokering. Such logic acts similar to a cloud native sidecar proxy. For instance, requests arriving to the system may be sent to the service X running in the local system (either IPU or compute platform) or forwarded to a peer IPU that has another instance of service X running The load balancing distribution can be based on existing algorithms such as based on the systems that have lower load, using round robin, etc.

Functionality for failover, resiliency and reliability. The IPU includes Reliability and Failover logic to monitor the status of the services running on the compute platform or the status of the compute platform itself. The Reliability and Failover logic may require the Load Balancing logic to transiently or permanently forward requests that aim specific services in situations such as where: i) The compute platform is not responding; ii) The service running inside the compute node is not responding; and iii) The compute platform load prevents the targeted service to provide the right level of service level objectives (SLOs). Note that the logic must know the required SLOs for the services. Such functionality may be coordinated with service information 650 including SLO information.

Functionality for executing parts of the workloads. Use cases such as video analytics tend to be decomposed in different microservices that conform a pipeline of actions that can be used together. The IPU may include a workload pipeline execution logic that understands how workloads are composed and manage their execution. Workloads can be defined as a graph that connects different microservices. The load balancing and brokering logic may be able to understand those graphs and decide what parts of the pipeline are executed where. Further, to perform these and other operations, Intercept logic will also decode what requests are included as part of the requests.

Resource Management

A distributed network processing configuration may enable IPUs to perform important role for managing resources of edge appliances. As further shown in FIG. 6, the functional components of an IPU can operate to perform these and similar types of resource management functionalities.

As a first example, an IPU can provide management or access to external resources that are hosted in other locations and expose them as local resources using constructs such as Compute Express Link (CXL). For example, the IPU could potentially provide access to a remote accelerator that is hosted in a remote system via CXL.mem/cache and IO. Another example includes providing access to remote storage device hosted in another system. In this latter case, the local IPU could work with another IPU in the storage system and expose the remote system as PCIE VF/PF (virtual functions/physical functions) to the local host.

As a second example, an IPU can provide access to IPU-specific resources. Those IPU resource may be physical (such as storage or memory) or virtual (such as a service that provides access to random number generation).

As a third example, an IPU can manage local resources that are hosted in the system where it belongs. For example, the IPU can manage power of the local compute platform.

As a fourth example, an IPU can provide access to other type of elements that relate to resources (such as telemetry or other types of data). In particular, telemetry provides useful data for something that is needed to decide where to execute things or to identify problems.

I/O Management. Because the IPU is acting as a connection proxy between the external peers (compute systems, remote storage etc.) resources and the local compute, the IPU can also include functionality to manage I/O from the system perspective.

Host Virtualization and XPU Pooling. The IPU includes Host Virtualization and XPU Pooling logic responsible to manage the access to resources that are outside the system domain (or within the IPU) and that can be offered to the local compute system. Here, "XPU" refers to any type of a processing unit, whether CPU, GPU, VPU, an acceleration processing unit, etc. The IPU logic, after discovery and attestation, can agree with other systems to share external resources with the services running in the local system. IPUs may advertise to other peers available resources or can be discovered during discovery phase as introduced earlier. IPUs may request to other IPUS to those resources. For example, an IPU on system A may request access to storage on system B manage by another IPU. Remote and local IPUs can work together to establish a connection between the target resources and the local system.

Once the connection and resource mapping is completed, resources can be exposed to the services running in the local compute node using the VF/PF PCIE and CXL Logic. Each of those resources can be offered as VF/PF. The IPU logic can expose to the local host resources that are hosted in the IPU. Examples of resources to expose may include local accelerators, access to services, and the like.

Power Management. Power management is one of the key features to achieve favorable system operational expenditures (OPEXs). IPU is very well positioned to optimize power consumption that the local system is consuming. The Distributed and local power management unit Is responsible to meter the power that the system is consuming, the load that the system is receiving and track the service level agreements that the various services running in the system are achieving for the arriving requests. Likewise, when power efficiencies (e.g., power usage effectiveness (PUE)) are not achieving certain thresholds or the local compute demand is low, the IPU may decide to forward the requests to local services to other IPUs that host replicas of the services. Such power management features may also coordinate with the Brokering and Load Balancing logic discussed above. As will be understood, IPUs can work together to decide where requests can be consolidated to establish higher power efficiency as system. When traffic is redirected, the local power consumption can be reduced in different ways. Example operations that can be performed include: changing the system to C6 State; changing the base frequencies; performing other adaptations of the system or system components.

Telemetry Metrics. The IPU can generate multiple types of metrics that can be interesting from services, orchestration or tenants owning the system. In various examples, telemetry can be accessed, including: (i) Out of band via side interfaces; (ii) In band by services running in the IPU; or (iii) Out of band using PCIE or CXL from the host perspective. Relevant types of telemetries can include: Platform telemetry; Service Telemetry; IPU telemetry; Traffic telemetry; and the like.

System Configurations for Distributed Processing

Further to the examples noted above, the following configurations may be used for processing with distributed IPUs:

1) Local IPUs connected to a compute platform by an interconnect (e.g., as shown in the configuration of FIG. 4);

2) Shared IPUs hosted within a rack/physical network—such as in a virtual slice or multi-tenant implementation of IPUs connected via CXL/PCI-E (local), or extension via Ethernet/Fiber for nodes within a cluster;

3) Remote IPUs accessed via an IP Network, such as within certain latency for data plane offload/storage offloads (or, connected for management/control plane operations); or 4) Distributed IPUs providing an interconnected network of IPUs, including as many as hundreds of nodes within a domain.

Configurations of distributed IPUs working together may also include fragmented distributed IPUs, where each IPU or pooled system provides part of the functionalities, and each IPU becomes a malleable system. Configurations of distributed IPUs may also include virtualized IPUs, such as provided by a gateway, switch, or an inline component (e.g., inline between the service acting as IPU), and in some examples, in scenarios where the system has no IPU.

Other deployment models for IPUs may include IPU-to-IPU in the same tier or a close tier; IPU-to-IPU in the cloud (data to compute versus compute to data); integration in small device form factors (e.g., gateway IPUs); gateway/NUC+IPU which connects to a data center; multiple GW/NUC (e.g. 16) which connect to one IPU (e.g. switch); gateway/NUC+IPU on the server; and GW/NUC and IPU that are connected to a server with an IPU.

The preceding distributed IPU functionality may be implemented among a variety of types of computing architectures, including one or more gateway nodes, one or more aggregation nodes, or edge or core data centers distributed across layers of the network (e.g., in the arrangements depicted in FIGS. 2 and 3). Accordingly, such IPU arrangements may be implemented in an edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives. Such edge computing systems may be embodied as a type of device, appliance, computer, or other "thing" capable of communicating with other edge, networking, or endpoint components.

Figure 7:
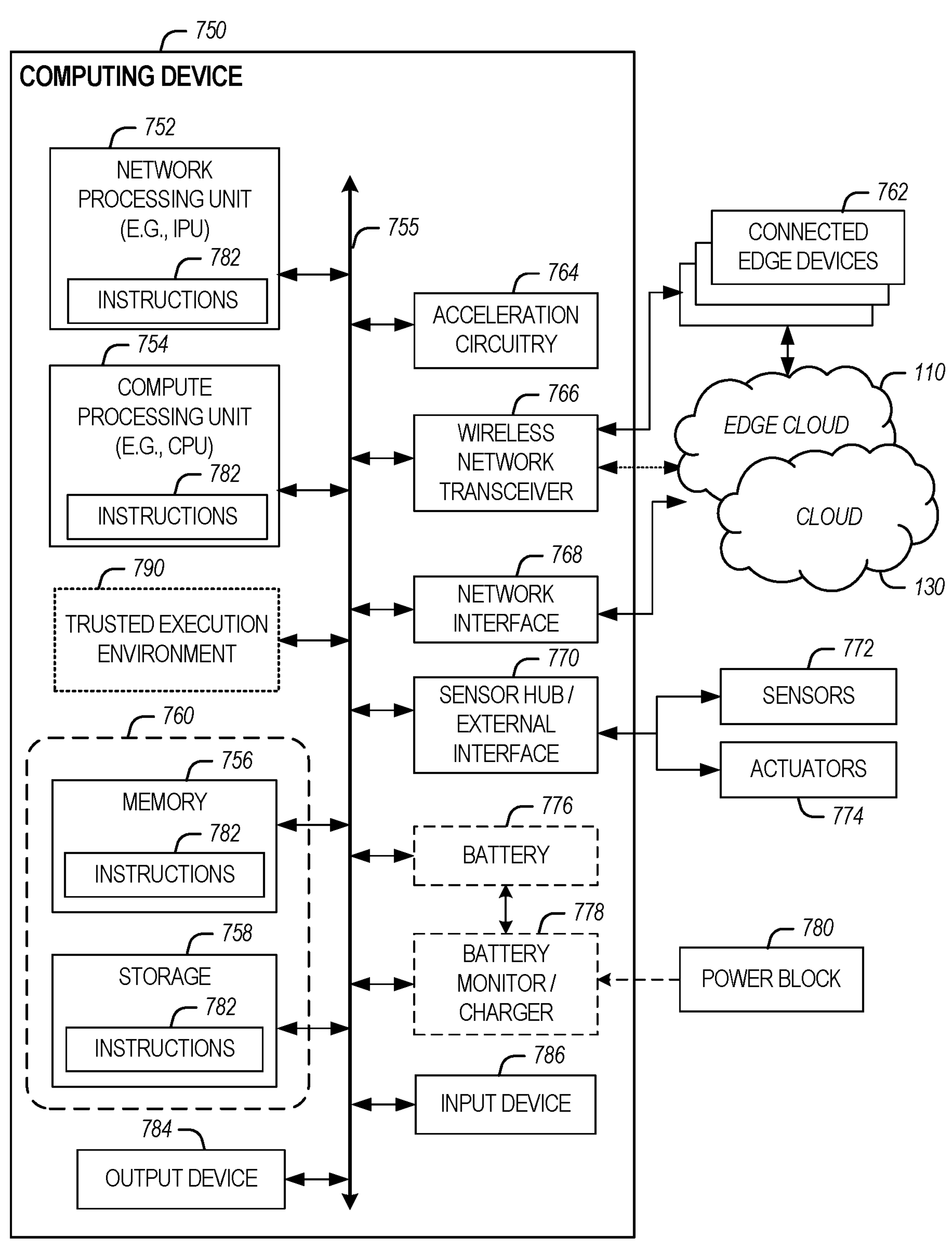
FIG. 7 depicts a block diagram of example components in an edge computing system which implements a distributed network processing platform, according to an example.

FIG. 7 depicts a block diagram of example components in a computing device 750 which can operate as a distributed network processing platform. The computing device 750 may include any combinations of the components referenced above, implemented as integrated circuits (ICs), as a package or system-on-chip (SoC), or as portions thereof, discrete electronic devices, or other modules, logic, instruction sets, programmable logic or algorithms, hardware, hardware accelerators, software, firmware, or a combination thereof adapted in the computing device 750, or as components otherwise incorporated within a larger system. Specifically, the computing device 750 may include processing circuitry comprising one or both of a network processing unit 752 (e.g., an IPU or DPU, as discussed above) and a compute processing unit 754 (e.g., a CPU).

The network processing unit 752 may provide a networked specialized processing unit such as an IPU, DPU, network processing unit (NPU), or other "xPU" outside of the central processing unit (CPU). The processing unit may be embodied as a standalone circuit or circuit package, integrated within an SoC, integrated with networking circuitry (e.g., in a SmartNIC), or integrated with acceleration circuitry, storage devices, or AI or specialized hardware, consistent with the examples above.

The compute processing unit 754 may provide a processor as a central processing unit (CPU) microprocessor, multi-core processor, multithreaded processor, an ultra-low voltage processor, an embedded processor, or other forms of a special purpose processing unit or specialized processing unit for compute operations.

Either the network processing unit 752 or the compute processing unit 754 may be a part of a system on a chip (SoC) which includes components formed into a single integrated circuit or a single package. The network processing unit 752 or the compute processing unit 754 and accompanying circuitry may be provided in a single socket form factor, multiple socket form factor, or a variety of other formats.

The processing units 752, 754 may communicate with a system memory 756 (e.g., random access memory (RAM)) over an interconnect 755 (e.g., a bus). In an example, the system memory 756 may be embodied as volatile (e.g., dynamic random access memory (DRAM), etc.) memory. Any number of memory devices may be used to provide for a given amount of system memory. A storage 758 may also couple to the processor 752 via the interconnect 755 to provide for persistent storage of information such as data, applications, operating systems, and so forth. In an example, the storage 758 may be implemented as non-volatile storage such as a solid-state disk drive (SSD).

The components may communicate over the interconnect 755. The interconnect 755 may include any number of technologies, including industry-standard architecture (ISA), extended ISA (EISA), peripheral component interconnect (PCI), peripheral component interconnect extended (PCIx), PCI express (PCIe), Compute Express Link (CXL), or any number of other technologies. The interconnect 755 may couple the processing units 752, 754 to a transceiver 766, for communications with connected edge devices 762.

The transceiver 766 may use any number of frequencies and protocols. For example, a wireless local area network (WLAN) unit may implement Wi-Fi® communications in accordance with the Institute of Electrical and Electronics Engineers (IEEE) 802.11 standard, or a wireless wide area network (WWAN) unit may implement wireless wide area communications according to a cellular, mobile network, or other wireless wide area protocol. The wireless network transceiver 766 (or multiple transceivers) may communicate using multiple standards or radios for communications at a different range. A wireless network transceiver 766 (e.g., a radio transceiver) may be included to communicate with devices or services in the edge cloud 110 or the cloud 130 via local or wide area network protocols.

The communication circuitry (e.g., transceiver 766, network interface 768, external interface 770, etc.) may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, an IoT protocol such as IEEE 802.15.4 or ZigBee®, Matter®, low-power wide-area network (LPWAN) or low-power wide-area (LPWA) protocols, etc.) to effect such communication. Given the variety of types of applicable communications from the device to another component or network, applicable communications circuitry used by the device may include or be embodied by any one or more of components 766, 768, or 770. Accordingly, in various examples, applicable means for communicating (e.g., receiving, transmitting, etc.) may be embodied by such communications circuitry.

The computing device 750 may include or be coupled to acceleration circuitry 764, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 755 may couple the processing units 752, 754 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as LEDs or more complex outputs such as display screens (e.g., LCD screens), with the output of characters, graphics, multimedia objects, and the like being generated or produced from the operation of the edge computing node 750.

A battery 776 may power the edge computing node 750, although, in examples in which the edge computing node 750 is mounted in a fixed location, it may have a power supply coupled to an electrical grid, or the battery may be used as a backup or for temporary capabilities. A battery monitor/charger 778 may be included in the edge computing node 750 to track the state of charge (SoCh) of the battery 776. The battery monitor/charger 778 may be used to monitor other parameters of the battery 776 to provide failure predictions, such as the state of health (SoH) and the state of function (SoF) of the battery 776. A power block 780, or other power supply coupled to a grid, may be coupled with the battery monitor/charger 778 to charge the battery 776.

In an example, the instructions 782 on the processing units 752, 754 (separately, or in combination with the instructions 782 of the machine-readable medium 760) may configure execution or operation of a trusted execution environment (TEE) 790. In an example, the TEE 790 operates as a protected area accessible to the processing units 752, 754 for secure execution of instructions and secure access to data. Other aspects of security hardening, hardware roots-of-trust, and trusted or protected operations may be implemented in the edge computing node 750 through the TEE 790 and the processing units 752, 754.

The computing device 750 may be a server, appliance computing devices, and/or any other type of computing device with the various form factors discussed above. For example, the computing device 750 may be provided by an appliance computing device that is a self-contained electronic device including a housing, a chassis, a case, or a shell.

In an example, the instructions 782 provided via the memory 756, the storage 758, or the processing units 752,

754 may be embodied as a non-transitory, machine-readable medium 760 including code to direct the processor 752 to perform electronic operations in the edge computing node 750. The processing units 752, 754 may access the non-transitory, machine-readable medium 760 over the interconnect 755. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processing units 752, 754 to perform a specific sequence or flow of actions, for example, as described with respect to the flowchart(s) and block diagram(s) of operations and functionality discussed herein. As used herein, the terms "machine-readable medium", "machine-readable storage", "computer-readable storage", and "computer-readable medium" are interchangeable.

In further examples, a machine-readable medium also includes any tangible medium that is capable of storing, encoding, or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers.

In further examples, a software distribution platform (e.g., one or more servers and one or more storage devices) may be used to distribute software, such as the example instructions discussed above, to one or more devices, such as example processor platform(s) and/or example connected edge devices noted above. The example software distribution platform may be implemented by any computer server, data facility, cloud service, etc., capable of storing and transmitting software to other computing devices. In some examples, the providing entity is a developer, a seller, and/or a licensor of software, and the receiving entity may be consumers, users, retailers, OEMs, etc., that purchase and/or license the software for use and/or re-sale and/or sub-licensing.

Turning now to FIGS. 8-11, these illustrate various mechanisms for developing a plan for distributed computation and executing the plan. In a distributed IPU environment (e.g., IPU mesh), one or more IPUs act as an orchestrator to map a computational workload to computing resources that are exposed by IPUs in the distributed IPU environment. When acting as an orchestrator or scheduler, an IPU may operate based on policies (e.g., SLA or SLO) to achieve a multi-objective optimization goal. Objectives may include restrictions, such as maintaining data at a certain locality, maintaining data at a certain level of security, using a certain level of security for temporary storage at rest, or the like.

Offloading the orchestration task to the distributed IPU environment allows for the IPUs across the mesh to handle data flow and execution transparently to the requestor or client device. Instead, the requestor may only see a single side car executing, for instance.

The IPUs act on network traffic as direct sources and sinks. As such, IPUs are able to react quicker to dynamically changing network conditions and can participate in managing on-the-fly changes to an execution plan. For instance, in an implementation, instead of sending data to a node where computation is available, data may be sharded and the data available from a given shard may be used for local computations, or such data may be sent to a node in the vicinity of that shard, and thus intermediate results may be computed with minimal data movement, while final results may be computed by moving a very small amount of data over far distances.

FIG. 8 is a block diagram illustrating the general flow for distributing computation, according to an example. There are two main phases: planning a distributed computation (operation 802) and executing the plan (operation 804).

At 802, IPUs in an IPU mesh provide information about resource maps and data maps. The resource maps include details of resources exposed by an IPU. The resources may include compute, memory, storage, or network resources provided by a host that the IPU is managing. A resource may be dynamically maintained so that it represents real-time or near real-time state of resources in the resource map.

A data map may include the location, version, type, amount, or other aspects of data that is stored at a host, which may be managed by an IPU. Like a resource map, a data map may be dynamically updated to represent real-time or near real-time state of data. Data may be sharded, replicated, partitioned, or maintained with different mechanisms across two or more hosts in an IPU mesh. This distributed data scheme allows for local computation of or over data where the data exists, to minimize data transfers of larger input data, and allow for more economical data transfers of resultant (output) data, which is typically much less than input data.

A host may refer to various network components, such as: a server; a networked machine with a data storage device; a data storage device; a storage appliance connected via network and capable of receiving and furnishing data directly using protocols like NFS, gRPC, iSCSI; a file server; or the like. An IPU can serve not just as a device separate from a host CPU, but also as a point for executing just control plane code for a data storage element that is independently reachable over a network. This arrangement may be referred to as IPU exposing a headless storage element.

An IPU or multiple IPUs may act on the resource maps and data maps for query planning and operation planning The mesh of IPUs act as a filter over a large amount of information represented in the resource and data maps, so that computation planning can focus on a small number of top-N candidates for design space exploration to identify alternative computation plans. The value of N may be static value set by an administrator (e.g., top-100 plans, top-50 plans, etc.) or it may be based on the number of IPUs in a mesh (e.g., top-10%, top-15%, etc.) or may be otherwise determined.

At 804, the IPUs that are distributed across nodes at the edge, or at boundary nodes at cloud gateways, or at cloud nodes themselves, organize into a logically all-to-all IPU mesh, and through it, direct the routing of a chain of computations and flow of results between those computations. An all-to-all connectivity model is one where routes may be computed between any IPU and every other IPU over physical networks, where within the physical network every IPU is not necessarily directly connected (1-hop) to every other IPU.

The chain and the ordering dependencies of different computations and which nodes to send them to are captured in a high-level data structure that is parsed at the IPUs to which it is sent. When a computation in a chain is complete at one node S01 whose IPU is IPU01, and the data/results from it need to flow to a dependent computation that is earmarked for being performed at a second node S02 whose IPU is IPU02, coordination of the flow and timing is performed directly between the IPUs IPU01 and IPU02. The requestor of the computation chain (e.g., an orchestrator) does not need to intervene individually with the two IPUs IPU01 and IPU02.

The successive IPUs in the chain of computations that are described in a plan communicate proactively with one another, so that the scheduling of CPUs, GPUs, FPGAs, etc. for the chain of computations can be performed in advance and fine-tuned as needed, in order to achieve streamlined execution of the chain of computations. Similarly, where the plan forecasts a large amount of data to be transferred, the IPUs also reserve the bandwidth quotas for the paths/multi-paths between each other so that such data can flow from producers to consumers in the chain and can be buffered in memory or high speed storage for fast retrieval at or in proximity to the consuming computation.

Figure 9:
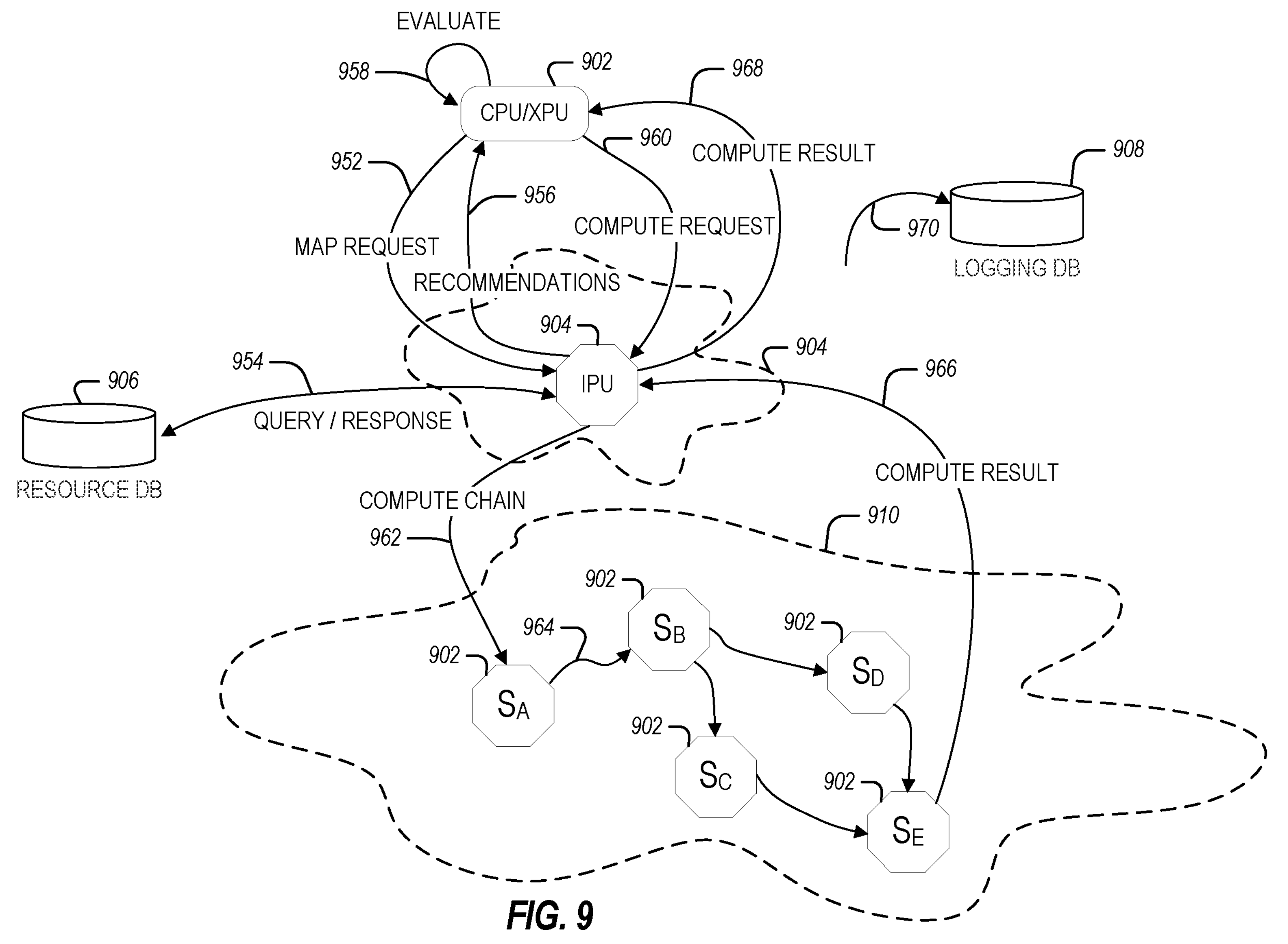
FIG. 9 depicts the data and control flow when mapping computational workflows to compute resources in an edge-cloud environment, according to an example.

FIG. 9 depicts the data and control flow when mapping computational workflows to compute resources in an edge-cloud environment, according to an example. The operating environment includes a CPU or XPU platform 902, an edge local cloudlet 904, a resource database 906, a logging service and database 908, and a federation of IPUs 910. The CPU or XPU platform 902 may include any service, device, customer, or entity that is seeking to have a workload performed on its behalf. The edge local cloudlet 904 includes one or more hosts with corresponding IPUs that are configured to receive requests and implement planning of a distributed computational workload. The edge local cloudlet 904 includes a proximal IPU as measured by network hops or physical location. In a system that includes a local host and a local IPU, the IUP at the host is the proximal IPU. In other network configurations, the proximal IPU may be the first IPU encountered in the network by the requesting host. The proximal IPU handles the request from the CPU or XPU platform 902.

The resource database 906 includes information provided by computation servers, data servers, service and microservice platforms, and other resources that are available for use. The logging service 908 includes storage and compute functions to maintain logs of transactions that occur in the edge local cloudlet 904, resource database 906, and federation of IPUs 910. The federation of IPUs 910 includes two or more IPUs that act in concert to provide computation and data resources to perform an execution chain and satisfy an execution plan. The execution plan is designed to fulfil the requested workload.

In operation 952, a requesting entity or an agent or proxy of the requesting entity, sends a computation request to an IPU in the edge local cloudlet 904. The computation request may be described in terms of a graph of operations. The graph of operations includes logical identities of the data to be consumed or produced in the operations. The requesting entity (e.g., CPU or XPU 902) may optionally include a set of objectives. These objectives may be expressed in a service level agreement (SLA) or service level objectives (SLOs). The objectives may be expressed in the form of a multi-objective function that an orchestrating node uses in order to determine an optimal solution by maximizing the function. A set of default objectives may be selected or supplied by infrastructure policies when no other optimization objective is provided. The default objectives may be dynamic (e.g., time-varying).

Figure 10:
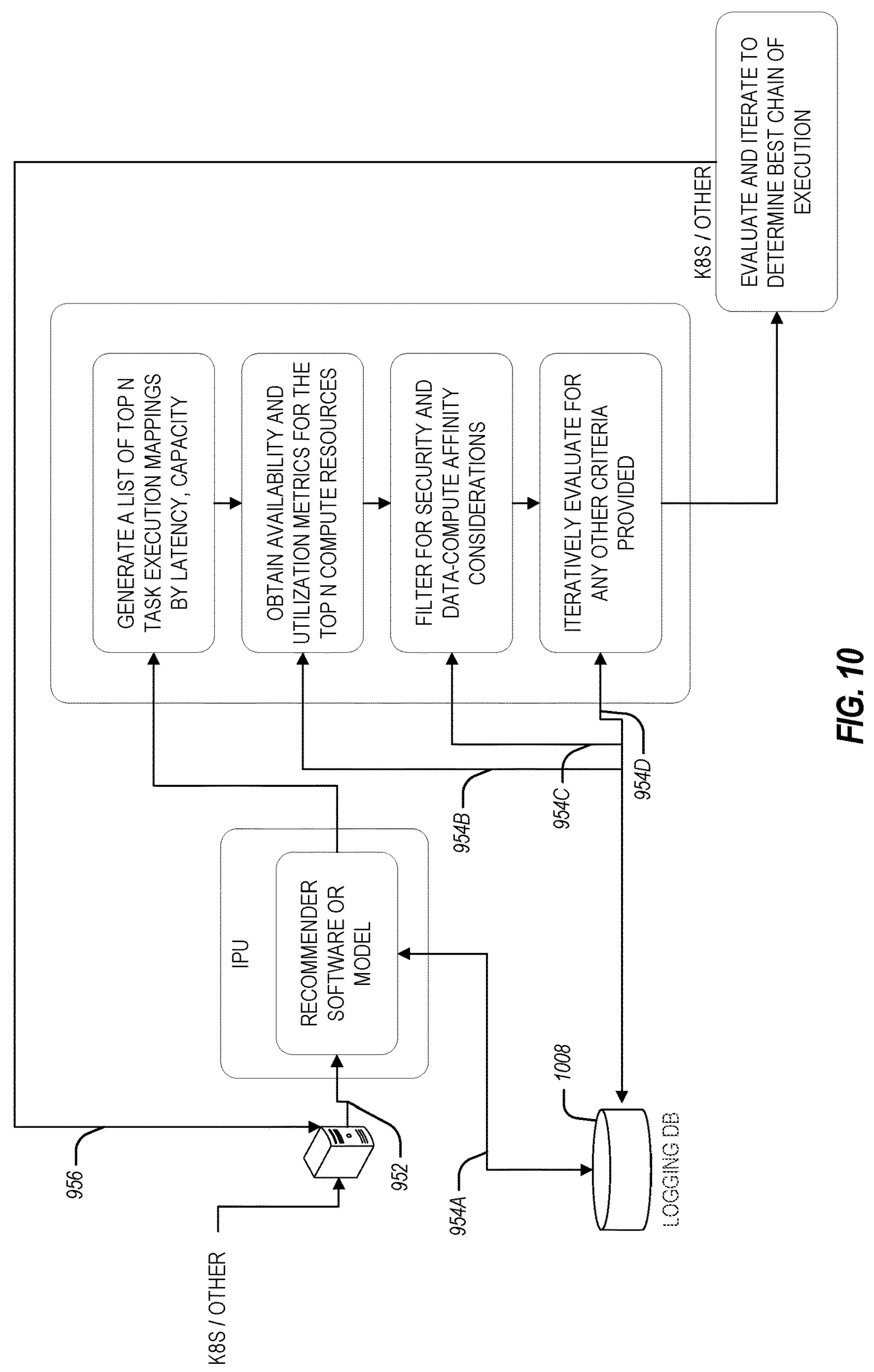
FIG. 10 depicts more details of the planning phase, according to an example.

In operation 954, a series of one or more iterations are used to select resources from the resource database 906. In each iteration, a request is made to the resource database 906 from the edge local cloudlet 904 and a response is provided. In an implementation, the request is in the form of a query to the resource database 906. The query result includes a sorted list of the resources that match the query. The query may seek to find the top-N recommendations of resources in terms of X. The X may be latency, cost, capacity, network distance (in terms of hops), or the like. The response may include a sorted list of servers that provide the requested resource and metrics that describe the state or capabilities of the server. The metrics may be collected and stored (e.g., centrally or distributed) in a database that is continuously updated with eventual consistency mechanisms. The resource database 906 may be updated by a background service. FIG. 10 below further describes specifics of the query-response mechanism.

In operation 956, the IPU that handled the requesting entity's request provides a selected number of recommendations where the different logical operations in the request are mapped to one or more computation and data servers based on the query results. The IPU provides the response to the CPU or XPU 902 requestor.

In operation 958, the requestor (e.g., CPU or XPU 902) evaluates and selects the best fit recommendation. Alternatively, the requestor may formulate a new mapping request and resubmit it to the edge local cloudlet 904. The requestor may want to keep a portion of the recommendations provided by the edge local cloudlet 904 and fine tune options for a subset of operations. The requestor may provide a revised or different multi-objective optimization function to maximize. After zero or more resubmit cycles, the requestor accepts the recommended resource assignments and the flow continues.

As a result of operations 952-958, the planning phase of the overall distributed execution is achieved. Operations 960-964 achieve execution of the plan.

In operation 960, the requestor transmits a compute chain request to the edge local cloudlet 904. A compute chain request is a request to execute a compute chain. The compute chain request is based on the resource mapping provided in the previous operations 952-958. The compute chain request includes the logical data descriptions and functions (e.g., microservices) used to process the data. The compute chain is an expression of a chain of operations/functions that are to be executed in a certain sequence.

In operation 962, the IPU mesh identifies the proximal IPUs or gateway IPUs for the different servers or logical entities identified in the compute chain request. The compute chain request is sent to at least the nodes in the IPU mesh that are going to handle the stages in the compute chain request. In another example, the compute chain request is sent to all nodes in the IPU mesh. The compute chain request may be broadcasted or multi-casted to the nodes.

In operation 964, the IPU mesh in the federation of IPUs 910 performs the operations described in the compute chain request at the named servers or principals. The IPU mesh assumes the responsibility of scheduling the resources at the respective servers, scheduling any data movements, coordinating producer-consumer flows including buffers, and so on.

Classic techniques for cluster scheduling may be used with some exceptions. Instead of the data movements being driven from CPUs, they are driven from service mesh at the respective IPUs. This ensures that the data movements are orchestrated/synchronized (via e.g., data parallel control loops) via scheduling related control signals, and keep in step with the dynamically flowing control information over time. Such control information may also include the compute resource states that may be utilized by the scheduler specially to account for the dynamism associated with the IPU mesh. As such, the distributed scheduler within IPU mesh may share the IPU compute states via control plane telemetry to help make decisions on resource scheduling.

As a result of operations 960-964, the execution phase of the distributed execution is achieved. Operations 966-970 achieve routing of the results of the execution plan.

In operation 966, the last IPU in the compute chain request provides the result, status, or output from the execution phase.

In operation 968, the last IPU in the compute chain sends the result or status to the requestor/agent (e.g., CPU or XPU 902). This may be performed by sending the result or status to the initial calling proximal IPU in the edge local cloudlet. At this point, it is not necessary that the receiver of the result is the same party that sent the computation request. Instead, the results may be transmitted to a designated party. This other party may be identified in operation 960, when the compute chain request is transmitted to the IPU mesh. This arrangement allows for continuing this type of chaining of operations at multiple levels of orchestration. For instance, the result of a request of a first party is sent to a second party, which uses the result as input for a second request. This arrangement is used for breaking down complex computations into layers of chained computations that continue as results from lower layers reach higher layers, and advance the computation to the next chained node at the higher layer.

In operation 970, a logging service 908 collects the overall operations manifest and makes it available for application-level monitoring and telemetry to proceed in parallel.

FIG. 10 depicts more details of the planning phase, according to an example. The planning phase includes operations 952-958 of FIG. 9. In FIG. 10, operations 952, 956, and 958 are generally the same as previously described.

In operation 952, either an orchestrator layer or an application or its cohort sends a request for mapping a logical computation flow to an IPU that is local or proximal to the requestor. That IPU runs a program for generating recommendations based on an analytical or simulation model or a mixed model. The program may be typically software, but may alternatively be software assisted by hardware to perform various optimizations.

As discussed above, operations 954 and 956 include the query to and the response from the IPU to the resource database for resource information. In FIG. 10, operation 954A is to request and obtain a set of initial inputs in the form of "top-N-by-a-key-criterion" where the key criterion may be latency, cost, capacity (throughput), etc. by type of computation, from the distributed loosely consistent resource database (e.g., resource database 906).

The distributed resource database is kept approximately current by asynchronous updates from various parts of the distributed infrastructure. The distributed resource database is also updated by local software at each IPU that refreshes a local copy of the distributed database according to types of resources most frequently used or most recently requested in order to map computations to them. Thus, the IPU proximal to the requestor computes a list of 'N' best candidates, by overall estimated latency, capacity, etc. for the logical computations being requested for assigning to resources at large (security and other criteria may also play a role in such mapping). The criteria for selecting the list of 'N' best candidates depend on the application requestor's criteria in operation 952.

This shorter listing allows the IPU to proceed to operation 954B where it requests and obtains availability, utilization, and other metrics (including network link utilizations and latencies) for determining the current conditions (as opposed to just relying on average metrics that may be given to it in operation 954A). In similar interactions including operations 954C and 954D, additional other criteria may be fitted so that for example, data-compute affinity is factored in to reduce the weighted distance that data needs to move from its previous location to the best matched next location where it is to be used in a computation. The weighted distance includes the cost of transforming data for security, message/packet serialization-deserialization, etc. Other such factors may include sustainability metrics (like use of green power), PUE (Power Usage Effectiveness) (how efficiently does power usage translate into computational work), etc. The optimization/refining flow ties together with application (Requestor) criteria to achieve an overall multi-objective maximization function (operation 956) and thus it may, at times result in reissuing a new request (operation 952) in order to drill into and explore fine-tuned adjustments to previous-best mapping of computation flow.

The result of this iterative execution produces the "chained compute request" for specific servers/clusters/datacenters/etc., which is then sent to one or more IPUs covering the specific servers, clusters, datacenters etc., in operation 960 of FIG. 9.

Figure 11:
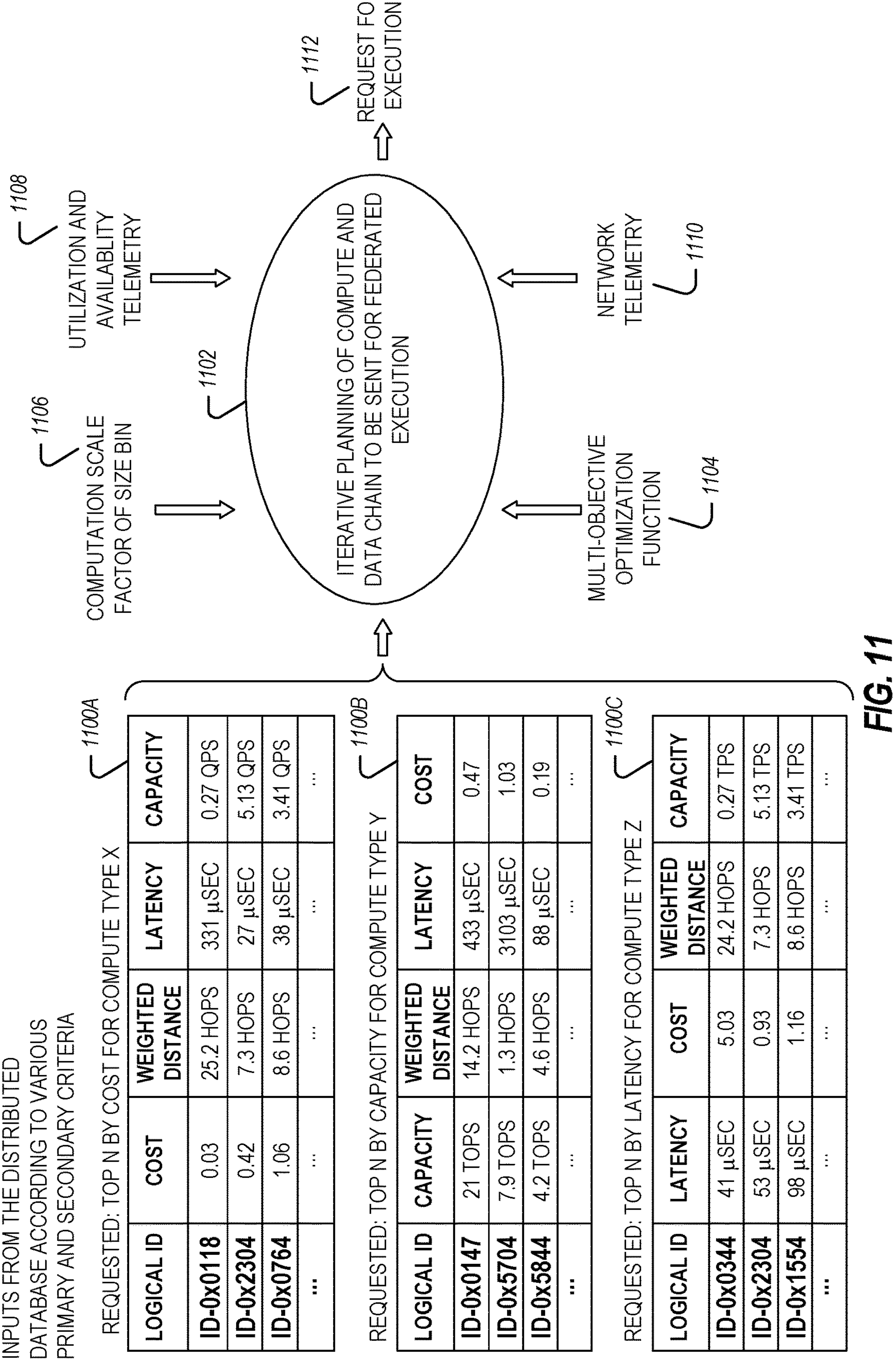
FIG. 11 depicts inputs and factors used in iterative refinements during the planning phase, according to an example.

FIG. 11 depicts inputs and factors used in iterative refinements during the planning phase, according to an example. In particular, FIG. 11 illustrates inputs from the distributed database component and their use in iterative refinement. FIG. 11 does not explicitly break down actions into steps because the operations shown in FIG. 11 are iterative refinements that happen by exploring the direction in which maximum optimization should be obtained, relative to a current tentative plan that is formed on the basis of previous iterations.

Various queries 1100A, 1100B, 1100C are illustrated. These queries 1100A-C produce different top-N-by-X results, where N is the number of candidates returned, and X is the criterion on which they are requested by the IPU. For each result list that is returned, the query results also include a number of other columns depicting secondary metrics that were requested. This is a classic query-response interaction.

The queries 1100A-C are used in an evaluation 1102, which takes a multi-objective optimization function 1104 from the requestor, the size or "scale-factor" 1106 for that computation (so that the evaluation 1102 can evaluate scale of capacity supported at different nodes), telemetry data on the computation 1108 and network telemetry 1110 of network environments corresponding to the nodes identified in the top-N-by-X results. The evaluation 1102 produces a mapping, which is used in the request for execution 1112. The mapping may be SLO-weighted in general. The multi-objective optimization function 1104 may use different strategies such as best-fit, greedy, time-interval based, etc., while recommendation outputs from the database may be based on classic top-N or deep learning based top-N training.

While the discussion has used a generic workflow as illustration, it is understood that any type of workflow may be evaluated and executed using the IPU mesh described herein. An example workflow is use of acceleration unit. In such an example, IPUs can be a head-node for acceleration units that it uses specifically for the media operations. An IPU may offload work to another IPU. By performing offloading and migration at the IPU-level, the IPU mesh can both pool unused utilizations (surplus capacities) and offload to a remote IPU if local pooled acceleration capacity is approaching saturation. In effect, an IPU acts to broker accelerator capacities. As a fallback it can perform the operations using the IPU's own computational power if the IPU's compute unit is not under stress.

An IPU in an IPU mesh may also be used to manage accelerator units in an environment where there are very few or no general CPUs available. In such a role, an IPU can provide the functions of (1) discovering bitstreams, (2) authenticating bitstreams, and (3) installing bitstreams on a dynamic basis on available slices of FPGAs, and (4) providing for proactive load balancing so that, for example, while the IPU is performing a bitstream install on accelerator A, it is temporarily overloading work on accelerator B so that the work does not have to wait too long.

FIG. 12 is a flowchart illustrating a method 1200 for orchestrating functions in a network compute mesh, according to an example. A network compute mesh includes a plurality of compute nodes, where each node includes at least a central processing unit (CPU) or set of CPUs. Some compute nodes in the network compute mesh may include network-addressable processing units, such as NPUs, IPUs, or DPUs.

At 1202, the method 1200 includes receiving, at a network-addressable processing unit of a network-addressable processing unit mesh from a requestor device, a computation request to execute a workflow with a set of objectives.

In an embodiment, the set of objectives are expressed in a service level agreement. In a related embodiment, the set of objectives are expressed as service level objectives. In another embodiment, the set of objectives are expressed as a multi-objective function. In another embodiment, the set of objectives are default objectives.

At 1204, the method 1200 includes querying at least one other network-addressable processing units of the network-addressable processing unit mesh using the set of objectives, to determine aspects of available resources and data in the network-addressable processing unit mesh to apply to the workflow.

In an embodiment, the aspects of available resources is provided by a second network-addressable processing unit of the network-addressable processing unit mesh in a resource map. In a related embodiment, the aspects of available resources include a percentage of compute, a number of cycles of compute, an amount of memory, an amount of storage, or network resources of a second network-addressable processing unit or a host managed by the network-addressable processing unit.

In an embodiment, the aspects of available data is provided by a second network-addressable processing unit of the network-addressable processing unit mesh in a data map. In a related embodiment, the aspects of available data include a location, a version, a type, or an amount or data.

At 1206, the method 1200 includes transmitting a list of recommended resources available to execute the workflow to the requestor device, the list of recommended resources being ranked based on at least one dimension of the resources. In an embodiment, the list of resources includes a top N of resources based on the at least one dimension of the resources.

At 1208, the method 1200 includes obtaining a compute chain from the requestor device, the compute chain describing resource control transitions and data flow provided from the recommended resources and data in the network-addressable processing unit mesh.

At 1210, the method 1200 includes scheduling the execution of the workflow at one or more network-addressable processing units in the network-addressable processing unit mesh in accordance with the compute chain. In an embodiment, scheduling the execution of the workflow across the network-addressable processing unit mesh in accordance with the compute chain includes transmitting the compute chain to each network-addressable processing unit in the network-addressable processing unit mesh that is assigned to a resource used in the compute chain, where the respective network-addressable processing units associated with the respective resources used in the compute chain cooperatively coordinate resource scheduling and data movements to execute the compute chain.

In an embodiment, the method 1200 includes receiving a revised set of objectives from the requestor device, querying at least one other network-addressable processing units of the network-addressable processing unit mesh using the revised set of objectives, to determine aspects of available resources and data in the network-addressable processing unit mesh to apply to the workflow, and transmitting revised recommended resources available to execute the workflow to the requestor device, the revised recommended resources including a revised ranked list of resources based on at least one dimension of the resources.

In an embodiment, intermediate results of the execution of the compute chain are stored in a logging database. In another embodiment, the execution of the compute chain produces a result, which is stored in a logging database.

Although these implementations have been described concerning specific exemplary aspects, it will be evident that various modifications and changes may be made to these aspects without departing from the broader scope of the present disclosure. Many of the arrangements and processes described herein can be used in combination or in parallel implementations that involve terrestrial network connectivity (where available) to increase network bandwidth/throughput and to support additional edge services. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is disclosed. Thus, although specific aspects have been illustrated and described herein, it should be appreciated that any arrangement calculated to achieve the same purpose may be substituted for the specific aspects shown. This disclosure is intended to cover any adaptations or variations of various aspects. Combinations of the above aspects and other aspects not specifically described herein will be apparent to those of skill in the art upon reviewing the above description.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, such as modules, intellectual property (IP) blocks or cores, or mechanisms. Such logic or components may be hardware, software, or firmware communicatively coupled to one or more processors in order to carry out the operations described herein. Logic or components may be hardware modules (e.g., IP block), and as such may be considered tangible entities capable of performing specified operations and may be configured or arranged in a certain manner In an example, circuits may be arranged (e.g., internally or with respect to external entities such as other circuits) in a specified manner as an IP block, IP core, system-on-chip (SoC), or the like.

In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

An IP block (also referred to as an IP core) is a reusable unit of logic, cell, or integrated circuit. An IP block may be used as a part of a field programmable gate array (FPGA), application-specific integrated circuit (ASIC), programmable logic device (PLD), system on a chip (SoC), or the like. It may be configured for a particular purpose, such as digital signal processing or image processing. Example IP cores include central processing unit (CPU) cores, integrated graphics, security, input/output (I/O) control, system agent, graphics processing unit (GPU), artificial intelligence, neural processors, image processing unit, communication interfaces, memory controller, peripheral device control, platform controller hub, or the like.

In some examples, the instructions are stored on storage devices of the software distribution platform in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions stored in the software distribution platform are in a first format when transmitted to an example processor platform(s). In some examples, the first format is an executable binary in which particular types of the processor platform(s) can execute. However, in some examples, the first format is uncompiled code that requires one or more preparation tasks to transform the first format to a second format to enable execution on the example processor platform(s). For instance, the receiving processor platform(s) may need to compile the computer readable instructions in the first format to generate executable code in a second format that is capable of being executed on the processor platform(s). In still other examples, the first format is interpreted code that, upon reaching the processor platform(s), is interpreted by an interpreter to facilitate execution of instructions.

Use Cases and Additional Examples

An IPU can be hosted in any of the tiers that go from device to cloud. Any compute platform that needs connectivity can potentially include an IPU. Some examples of places where IPUs can be placed are: Vehicles; Far Edge; Data center Edge; Cloud; Smart Cameras; Smart Devices.

Some of the use cases for a distributed IPU may include the following.

1) Service orchestrator (local, shared, remote, or distributed): Power, Workload perf, ambient temp prediction and optimization tuning and service orchestration not just locally but across distributed Edge Cloud 2) Infrastructure offload (for local machine)—same as traditional IPU use-cases to offload network, storage, host virtualization etc. but additional Edge Network Security Edge specific usages, Storage Edge specific usages, Virtualization Edge specific usages 3) IPU as a host to augment compute capacity (using ARM/x86 cores) for running edge specific "functions" on demand, integrated as API/Service or running as K8s worker node for certain types of services, side car proxies, security attestation services, scrubbing traffic for SASE/L7 inspection Firewall, Load balancer/Forward or reverse Proxy, Service Mesh side cars (for each POD running on local host) etc. 5G UPF and other RAN offloads Etc.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is a device for orchestrating functions in a network compute mesh, comprising: a memory device configured to store instructions; and a processor subsystem, which when configured by the instructions, is operable to: receive, at a network-addressable processing unit of a network-addressable processing unit mesh from a requestor device, a computation request to execute a workflow with a set of objectives; query at least one other network-addressable processing units of the network-addressable processing unit mesh using the set of objectives, to determine aspects of available resources and data in the network-addressable processing unit mesh to apply to the workflow; transmit a list of recommended resources available to execute the workflow to the requestor device, the list of recommended resources being ranked based on at least one dimension of the resources; obtain a compute chain from the requestor device, the compute chain describing resource control transitions and data flow provided from the recommended resources and data in the network-addressable processing unit mesh; and schedule the execution of the workflow at one or more network-addressable processing units in the network-addressable processing unit mesh in accordance with the compute chain.

In Example 2, the subject matter of Example 1 includes, wherein the set of objectives are expressed in a service level agreement.

In Example 3, the subject matter of Examples 1-2 includes, wherein the set of objectives are expressed as service level objectives.

In Example 4, the subject matter of Examples 1-3 includes, wherein the set of objectives are expressed as a multi-objective function.

In Example 5, the subject matter of Examples 1-4 includes, wherein the set of objectives are default objectives.

In Example 6, the subject matter of Examples 1-5 includes, wherein the aspects of available resources is provided by a second network-addressable processing unit of the network-addressable processing unit mesh in a resource map.

In Example 7, the subject matter of Examples 1-6 includes, wherein the aspects of available resources include a percentage of compute, a number of cycles of compute, an amount of memory, an amount of storage, or network resources of a second network-addressable processing unit or a host managed by the network-addressable processing unit.

In Example 8, the subject matter of Examples 1-7 includes, wherein the aspects of available data is provided by a second network-addressable processing unit of the network-addressable processing unit mesh in a data map.

In Example 9, the subject matter of Examples 1-8 includes, wherein the aspects of available data include a location, a version, a type, or an amount or data.

In Example 10, the subject matter of Examples 1-9 includes, wherein the processor subsystem is to: receive a revised set of objectives from the requestor device; query at least one other network-addressable processing units of the network-addressable processing unit mesh using the revised set of objectives, to determine aspects of available resources and data in the network-addressable processing unit mesh to apply to the workflow; and transmit revised recommended resources available to execute the workflow to the requestor device, the revised recommended resources including a revised ranked list of resources based on at least one dimension of the resources.

In Example 11, the subject matter of Examples 1-10 includes, wherein the list of resources includes a top N of resources based on the at least one dimension of the resources.

In Example 12, the subject matter of Examples 1-11 includes, wherein to schedule the execution of the workflow across the network-addressable processing unit mesh in accordance with the compute chain, the processor subsystem is to: transmit the compute chain to each network-addressable processing unit in the network-addressable processing unit mesh that is assigned to a resource used in the compute chain, wherein the respective network-addressable processing units associated with the respective resources used in the compute chain cooperatively coordinate resource scheduling and data movements to execute the compute chain.

In Example 13, the subject matter of Examples 1-12 includes, wherein intermediate results of the execution of the compute chain are stored in a logging database.

In Example 14, the subject matter of Examples 1-13 includes, wherein the execution of the compute chain produces a result, which is stored in a logging database.

Example 15 is a method for orchestrating functions in a network compute mesh, comprising: receiving, at a network-addressable processing unit of a network-addressable processing unit mesh from a requestor device, a computation request to execute a workflow with a set of objectives; querying at least one other network-addressable processing units of the network-addressable processing unit mesh using the set of objectives, to determine aspects of available resources and data in the network-addressable processing unit mesh to apply to the workflow; transmitting a list of recommended resources available to execute the workflow to the requestor device, the list of recommended resources being ranked based on at least one dimension of the resources; obtaining a compute chain from the requestor device, the compute chain describing resource control transitions and data flow provided from the recommended resources and data in the network-addressable processing unit mesh; and scheduling the execution of the workflow at one or more network-addressable processing units in the network-addressable processing unit mesh in accordance with the compute chain.

In Example 16, the subject matter of Example 15 includes, wherein the set of objectives are expressed in a service level agreement.

In Example 17, the subject matter of Examples 15-16 includes, wherein the set of objectives are expressed as service level objectives.

In Example 18, the subject matter of Examples 15-17 includes, wherein the set of objectives are expressed as a multi-objective function.

In Example 19, the subject matter of Examples 15-18 includes, wherein the set of objectives are default objectives.

In Example 20, the subject matter of Examples 15-19 includes, wherein the aspects of available resources is provided by a second network-addressable processing unit of the network-addressable processing unit mesh in a resource map.

In Example 21, the subject matter of Examples 15-20 includes, wherein the aspects of available resources include a percentage of compute, a number of cycles of compute, an amount of memory, an amount of storage, or network resources of a second network-addressable processing unit or a host managed by the network-addressable processing unit.

In Example 22, the subject matter of Examples 15-21 includes, wherein the aspects of available data is provided by a second network-addressable processing unit of the network-addressable processing unit mesh in a data map.

In Example 23, the subject matter of Examples 15-22 includes, wherein the aspects of available data include a location, a version, a type, or an amount or data.

In Example 24, the subject matter of Examples 15-23 includes, receiving a revised set of objectives from the requestor device; querying at least one other network-addressable processing units of the network-addressable processing unit mesh using the revised set of objectives, to determine aspects of available resources and data in the network-addressable processing unit mesh to apply to the workflow; and transmitting revised recommended resources available to execute the workflow to the requestor device, the revised recommended resources including a revised ranked list of resources based on at least one dimension of the resources.

In Example 25, the subject matter of Examples 15-24 includes, wherein the list of resources includes a top N of resources based on the at least one dimension of the resources.

In Example 26, the subject matter of Examples 15-25 includes, wherein scheduling the execution of the workflow across the network-addressable processing unit mesh in accordance with the compute chain comprises: transmitting the compute chain to each network-addressable processing unit in the network-addressable processing unit mesh that is assigned to a resource used in the compute chain, wherein the respective network-addressable processing units associated with the respective resources used in the compute chain cooperatively coordinate resource scheduling and data movements to execute the compute chain.

In Example 27, the subject matter of Examples 15-26 includes, wherein intermediate results of the execution of the compute chain are stored in a logging database.

In Example 28, the subject matter of Examples 15-27 includes, wherein the execution of the compute chain produces a result, which is stored in a logging database.

Example 29 is at least one machine-readable medium including instructions for orchestrating functions in a network compute mesh, which when executed by a machine, cause the machine to: receive, at a network-addressable processing unit of a network-addressable processing unit mesh from a requestor device, a computation request to execute a workflow with a set of objectives; query at least one other network-addressable processing units of the network-addressable processing unit mesh using the set of objectives, to determine aspects of available resources and data in the network-addressable processing unit mesh to apply to the workflow; transmit a list of recommended resources available to execute the workflow to the requestor device, the list of recommended resources being ranked based on at least one dimension of the resources; obtain a compute chain from the requestor device, the compute chain describing resource control transitions and data flow provided from the recommended resources and data in the network-addressable processing unit mesh; and schedule the execution of the workflow at one or more network-addressable processing units in the network-addressable processing unit mesh in accordance with the compute chain.

In Example 30, the subject matter of Example 29 includes, wherein the set of objectives are expressed in a service level agreement.

In Example 31, the subject matter of Examples 29-30 includes, wherein the set of objectives are expressed as service level objectives.

In Example 32, the subject matter of Examples 29-31 includes, wherein the set of objectives are expressed as a multi-objective function.

In Example 33, the subject matter of Examples 29-32 includes, wherein the set of objectives are default objectives.

In Example 34, the subject matter of Examples 29-33 includes, wherein the aspects of available resources is provided by a second network-addressable processing unit of the network-addressable processing unit mesh in a resource map.

In Example 35, the subject matter of Examples 29-34 includes, wherein the aspects of available resources include a percentage of compute, a number of cycles of compute, an amount of memory, an amount of storage, or network resources of a second network-addressable processing unit or a host managed by the network-addressable processing unit.

In Example 36, the subject matter of Examples 29-35 includes, wherein the aspects of available data is provided by a second network-addressable processing unit of the network-addressable processing unit mesh in a data map.

In Example 37, the subject matter of Examples 29-36 includes, wherein the aspects of available data include a location, a version, a type, or an amount or data.

In Example 38, the subject matter of Examples 29-37 includes, instructions to: receive a revised set of objectives from the requestor device; query at least one other network-addressable processing units of the network-addressable processing unit mesh using the revised set of objectives, to determine aspects of available resources and data in the network-addressable processing unit mesh to apply to the workflow; and transmit revised recommended resources available to execute the workflow to the requestor device, the revised recommended resources including a revised ranked list of resources based on at least one dimension of the resources.

In Example 39, the subject matter of Examples 29-38 includes, wherein the list of resources includes a top N of resources based on the at least one dimension of the resources.

In Example 40, the subject matter of Examples 29-39 includes, wherein the instructions to schedule the execution of the workflow across the network-addressable processing unit mesh in accordance with the compute chain comprise instructions to: transmit the compute chain to each network-addressable processing unit in the network-addressable processing unit mesh that is assigned to a resource used in the compute chain, wherein the respective network-addressable processing units associated with the respective resources used in the compute chain cooperatively coordinate resource scheduling and data movements to execute the compute chain.

In Example 41, the subject matter of Examples 29-40 includes, wherein intermediate results of the execution of the compute chain are stored in a logging database.

In Example 42, the subject matter of Examples 29-41 includes, wherein the execution of the compute chain produces a result, which is stored in a logging database.

Example 43 is at least one machine-readable medium including instructions that, when executed by processing circuitry, cause the processing circuitry to perform operations to implement of any of Examples 1-42.

Example 44 is an apparatus comprising means to implement of any of Examples 1-42.

Example 45 is a system to implement of any of Examples 1-42.

Example 46 is a method to implement of any of Examples 1-42.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A device for orchestrating functions in a network compute mesh, comprising:
 a memory device configured to store instructions; and
 a processor subsystem, which when configured by the instructions, is operable to:
  receive, at a network-addressable processing unit of a network-addressable processing unit mesh from a requestor device, a computation request to execute a workflow with a set of objectives;
  query at least one other network-addressable processing units of the network- addressable processing unit mesh using the set of objectives, to determine aspects of available resources and data in the network-addressable processing unit mesh to apply to the workflow;
  transmit a list of recommended resources available to execute the workflow to the requestor device, the list of recommended resources being ranked based on at least one dimension of the available resources;
  obtain a compute chain from the requestor device, the compute chain describing resource control transitions and data flow provided from resources in the list of recommended resources and data in the network-addressable processing unit mesh; and
  schedule the execution of the workflow at one or more network-addressable processing units in the network-addressable processing unit mesh in accordance with the compute chain.

2. The device of claim 1, wherein the set of objectives are expressed as service level objectives.

3. The device of claim 1, wherein the set of objectives are expressed as a multi-objective function.

4. The device of claim 1, wherein the set of objectives are default objectives.

5. The device of claim 1, wherein the aspects of available resources is provided by a second network-addressable processing unit of the network-addressable processing unit mesh in a resource map.

6. The device of claim 1, wherein the aspects of available resources include a percentage of compute, a number of cycles of compute, an amount of memory, an amount of storage, or network resources of a second network-addressable processing unit or a host managed by the network-addressable processing unit.

7. The device of claim 1, wherein the aspects of available data is provided by a second network-addressable processing unit of the network-addressable processing unit mesh in a data map.

8. The device of claim 1, wherein the aspects of available data include a location, a version, a type, or an amount or data.

9. The device of claim 1, wherein the processor subsystem is to:

receive a revised set of objectives from the requestor device;

query at least one other network-addressable processing units of the network-addressable processing unit mesh using the revised set of objectives, to determine aspects of available resources and data in the network-addressable processing unit mesh to apply to the workflow; and transmit revised recommended resources available to execute the workflow to the requestor device, the revised recommended resources including a revised ranked list of resources based on at least one dimension of the available resources.

10. The device of claim 1, wherein the list of recommended resources includes a top N of resources based on the at least one dimension of the available resources.

11. The device of claim 1, wherein to schedule the execution of the workflow across the network-addressable processing unit mesh in accordance with the compute chain, the processor subsystem is to:

transmit the compute chain to each network-addressable processing unit in the network-addressable processing unit mesh that is assigned to a resource used in the compute chain, wherein the respective network-addressable processing units associated with the respective resources used in the compute chain cooperatively coordinate resource scheduling and data movements to execute the compute chain.

12. The device of claim 1, wherein intermediate results of the execution of the compute chain are stored in a logging database.

13. The device of claim 1, wherein the execution of the compute chain produces a result, which is stored in a logging database.

14. A method for orchestrating functions in a network compute mesh, comprising:

receiving, at a network-addressable processing unit of a network-addressable processing unit mesh from a requestor device, a computation request to execute a workflow with a set of objectives;

querying at least one other network-addressable processing units of the network-addressable processing unit mesh using the set of objectives, to determine aspects of available resources and data in the network-addressable processing unit mesh to apply to the workflow;

transmitting a list of recommended resources available to execute the workflow to the requestor device, the list of recommended resources being ranked based on at least one dimension of the available resources;

obtaining a compute chain from the requestor device, the compute chain describing resource control transitions and data flow provided from resources in the list of recommended resources and data in the network-addressable processing unit mesh; and scheduling the execution of the workflow at one or more network-addressable processing units in the network-addressable processing unit mesh in accordance with the compute chain.

15. The method of claim 14, wherein the set of objectives are expressed in a service level agreement.

16. The method of claim 14, comprising:

receiving a revised set of objectives from the requestor device;

querying at least one other network-addressable processing units of the network-addressable processing unit mesh using the revised set of objectives, to determine aspects of available resources and data in the network-addressable processing unit mesh to apply to the workflow; and transmitting revised recommended resources available to execute the workflow to the requestor device, the revised recommended resources including a revised ranked list of resources based on at least one dimension of the available resources.

17. The method of claim 14, wherein the list of recommended resources includes a top N of resources based on the at least one dimension of the available resources.

18. The method of claim 14, wherein scheduling the execution of the workflow across the network-addressable processing unit mesh in accordance with the compute chain comprises:

transmitting the compute chain to each network-addressable processing unit in the network-addressable processing unit mesh that is assigned to a resource used in the compute chain, wherein the respective network-addressable processing units associated with the respective resources used in the compute chain cooperatively coordinate resource scheduling and data movements to execute the compute chain.

19. The method of claim 14, wherein intermediate results of the execution of the compute chain are stored in a logging database.

20. The method of claim 14, wherein the execution of the compute chain produces a result, which is stored in a logging database.

21. At least one non-transitory machine-readable medium including instructions for orchestrating functions in a network compute mesh, which when executed by a machine, cause the machine to:

receive, at a network-addressable processing unit of a network-addressable processing unit mesh from a requestor device, a computation request to execute a workflow with a set of objectives;

query at least one other network-addressable processing units of the network-addressable processing unit mesh using the set of objectives, to determine aspects of available resources and data in the network-addressable processing unit mesh to apply to the workflow;

transmit a list of recommended resources available to execute the workflow to the requestor device, the list of recommended resources being ranked based on at least one dimension of the available resources;

obtain a compute chain from the requestor device, the compute chain describing resource control transitions and data flow provided from resources in the list of recommended resources and data in the network-addressable processing unit mesh; and schedule the execution of the workflow at one or more network-addressable processing units in the network-addressable processing unit mesh in accordance with the compute chain.

22. The at least one non-transitory machine-readable medium of claim 21, comprising instructions to:

receive a revised set of objectives from the requestor device;

query at least one other network-addressable processing units of the network-addressable processing unit mesh using the revised set of objectives, to determine aspects of available resources and data in the network-addressable processing unit mesh to apply to the workflow; and transmit revised recommended resources available to execute the workflow to the requestor device, the revised recommended resources including a revised ranked list of resources based on at least one dimension of the available resources.

23. The at least one non-transitory machine-readable medium of claim 21, wherein the list of recommended resources includes a top N of resources based on the at least one dimension of the available resources.

24. The at least one non-transitory machine-readable medium of claim 21, wherein the instructions to schedule the execution of the workflow across the network-addressable processing unit mesh in accordance with the compute chain comprise instructions to:

transmit the compute chain to each network-addressable processing unit in the network-addressable processing unit mesh that is assigned to a resource used in the compute chain, wherein the respective network-addressable processing units associated with the respective resources used in the compute chain cooperatively coordinate resource scheduling and data movements to execute the compute chain.

25. The at least one non-transitory machine-readable medium of claim 21, wherein intermediate results of the execution of the compute chain are stored in a logging database.

* * * * *